US012645944B2

(12) United States Patent
Vahdat et al.

(10) Patent No.: US 12,645,944 B2
(45) Date of Patent: Jun. 2, 2026

(54) TRAINING ENERGY-BASED VARIATIONAL AUTOENCODERS

(71) Applicant: NVIDIA CORPORATION, Santa Clara, CA (US)

(72) Inventors: Arash Vahdat, Mountain View, CA (US); Karsten Kreis, Vancouver (CA); Zhisheng Xiao, Chicago, IL (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1130 days.

(21) Appl. No.: 17/357,738

(22) Filed: Jun. 24, 2021

(65) Prior Publication Data

US 2022/0101145 A1    Mar. 31, 2022

Related U.S. Application Data

(60) Provisional application No. 63/083,654, filed on Sep. 25, 2020.

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ........ G06N 3/088; G06N 3/045; G06N 3/047; G06N 7/01; G06N 3/0455; G06N 3/0464; G06N 3/0475; G06N 3/0895
See application file for complete search history.

(56) References Cited

U.S. PATENT DOCUMENTS

2020/0372654 A1    11/2020    Kohl et al.
2020/0401916 A1*   12/2020    Rolfe ....................... G06N 7/01

FOREIGN PATENT DOCUMENTS

CN    109313724 A    2/2019

OTHER PUBLICATIONS

Han, T. et al., "Joint Training of Variational Auto-Encoder and Latent Energy-Based Model", https://openaccess.thecvf.com/content_CVPR_2020/html/Han_Joint_Training_of_Variational_Auto-Encoder_and_Latent_Energy-Based_Model_CVPR_2020_paper.html, Jun. 10, 2020 (Year: 2020).*

(Continued)

*Primary Examiner* — Alexey Shmatov
*Assistant Examiner* — Devika S Maharaj
(74) *Attorney, Agent, or Firm* — Artegis Law Group, LLP

(57) ABSTRACT

One embodiment sets forth a technique for creating a generative model. The technique includes generating a trained generative model with a first component that converts data points in the training dataset into latent variable values, a second component that learns a distribution of the latent variable values, and a third component that converts the latent variable values into output distributions. The technique also includes training an energy-based model to learn an energy function based on values sampled from a first distribution associated with the training dataset and values sampled from a second distribution during operation of the trained generative model. The technique further includes creating a joint model that includes one or more portions of the trained generative model and the energy-based model, and that applies energy values from the energy-based model to samples from the second distribution to produce additional values used to generate a new data point.

21 Claims, 8 Drawing Sheets

(56) References Cited

OTHER PUBLICATIONS

Zhai, S. et al., "Generative Adversarial Networks as Variational Training of Energy Based Models", https://arxiv.org/abs/1611.01799 (Year: 2016).*

Ramachandran, P. et al., "Swish: A Self-Gated Activation Function", https://www.semanticscholar.org/paper/Swish%3A-a-Self-Gated-Activation-Function-Ramachandran-Zoph/4f57f486adea0bf95c252620a4e8af39232ef8bc (Year: 2017).*

Pang, B. et al., "Learning Latent Space Energy-Based Prior Model", https://arxiv.org/abs/2006.08205v1, Jun. 15, 2020 (Year: 2020).*

Liu, K. et al., "Spectral Regularization for Combating Mode Collapse in GANs", https://arxiv.org/abs/1908.10999 (Year: 2019).*

Nijkamp et al., "Learning Energy-based Model with Flow-based Backbone by Neural Transport MCMC", arXiv:2006.06897v1, Jun. 12, 2020, 16 pages.

Noé et al., "Boltzmann Generators: Sampling Equilibrium States of Many-Body Systems with Deep Learning", http://dx.doi.org/10.1126/science.aaw1147, vol. 365, Sep. 6, 2019, 13 pages.

Van Den Oord et al., "Wavenet: A Generative Model for Raw Audio", arXiv:1609.03499v1, Sep. 12, 2016, 15 pages.

Van Den Oord et al., "Pixel Recurrent Neural Networks", Proceedings of the 33rd International Conference on Machine Learning, vol. 48, aparXiv:1601.06759v3, Aug. 19, 2016, 11 pages.

Ostrovski et al., "Autoregressive Quantile Networks for Generative Modeling", Proceedings of the 35th International Conference on Machine Learning, arXiv:1806.05575v1, Jun. 14, 2018, 16 pages.

Kancharla et al., "Quality Aware Generative Adversarial Networks", 33rd Conference on Neural Information Processing Systems, 2019, 11 pages.

Pidhorskyi et al., "Adversarial Latent Autoencoders", arXiv:2004.04467v1, Apr. 9, 2020, 10 pages.

Ping et al., "Waveflow: A Compact Flow-Based Model for Raw Audio", arXiv:1912.01219v1, Dec. 3, 2019, 12 pages.

Ravuri et al., "Learning Implicit Generative Models with the Method of Learned Moments", Proceedings of the 35 th International Conference on Machine Learning, arXiv:1806.11006v1, Jun. 28, 2018, 17 pages.

Razavi et al., "Generating Diverse High-Fidelity Images with VQ-VAE-2", 33rd Conference on Neural Information Processing Systems, 2019, 11 pages.

Rezende et al., "Variational Inference with Normalizing Flows", Proceedings of the 32nd International Conference on Machine Learning, vol. 37, arXiv:1505.05770v1, May 21, 2015, 10 pages.

Rezende et al., "Stochastic Backpropagation and Approximate Inference in Deep Generative Models", Proceedings of the 31st International Conference on Machine Learning, vol. 32, arXiv:1401.4082v3, May 30, 2014, 14 pages.

Salakhutdinov et al., "Deep Boltzmann Machines", Appearing in Proceedings of the 12th International Conference on Artificial Intelligence and Statistics, vol. 5, 2009, 8 pages.

Salakhutdinov et al., "Restricted Boltzmann Machines for Collaborative Filtering", Appearing in Proceedings of the 24th International Conference on Machine Learning, 2007, 8 pages.

Salimans et al., "Weight Normalization: A Simple Reparameterization to Accelerate Training of Deep Neural Networks", 30th Conference on Neural Information Processing Systems, 2016, 9 pages.

Salimans et al., "Improved Techniques for Training GANs", arXiv:1606.03498v1, Jun. 10, 2016, 10 pages.

Sanchez-Lengeling et al., "Inverse Molecular Design Using Machine Learning: Generative Models for Matter Engineering", Science, vol. 361, Jul. 27, 2018, pp. 360-365.

Song et al., "Generative Modeling by Estimating Gradients of the Data Distribution", arXiv:1907.05600v1, Jul. 12, 2019, 22 pages.

Song et al., "Improved Techniques for Training Score-Based Generative Models", 34th Conference on Neural Information Processing Systems, 2020, 11 pages.

Song et al., "Discriminator Contrastive Divergence: Semi-Amortized Generative Modeling by Exploring Energy of the Discriminator", arXiv:2004.01704v, Apr. 5, 2020, 17 pages.

Srivastava et al., "VEEGAN: Reducing Mode Collapse in GANs using Implicit Variational Learning", arXiv:1705.07761v1, May 22, 2017, 16 pages.

Tzeng et al., "Adversarial Discriminative Domain Adaptation", arXiv:1702.05464v1, Feb. 17, 2017, 10 pages.

Vahdat et al., "NVAE: A Deep Hierarchical Variational Autoencoder", arXiv:2007.03898v1, Jul. 8, 2020, 20 pages.

Vahdat et al., "DVAE#: Discrete Variational Autoencoders with Relaxed Boltzmann Priors", arXiv:1805.07445v1, May 18, 2018, 11 pages.

Vahdat et al., "DVAE++: Discrete Variational Autoencoders with Overlapping Transformations", Proceedings of the 35th International Conference on Machine Learning, arXiv:1802.04920v2, May 25, 2018, 16 pages.

Vahdat et al., "Undirected Graphical Models as Approximate Posteriors", Proceedings of the 37 th International Conference on Machine Learning, arXiv:1901.03440v2, Jun. 7, 2020, 13 pages.

Vincent, Pascal, "A Connection Between Score Matching and Denoising Autoencoders", Neural Computation, vol. 23, 2011, pp. 1661-1674.

Woodford, Oliver, "Notes on Contrastive Divergence", Department of Engineering Science, University of Oxford, 2006, 3 pages.

Xiao et al., "Generative Latent Flow: A Framework for Non-adversarial Image Generation", arXiv:1905.10485v1, May 24, 2019, 15 pages.

Xiao et al., "Exponential Tilting of Generative Models: Improving Sample Quality By Training And Sampling From Latent Energy ", arXiv:2006.08100v1, Jun. 15, 2020, 15 pages.

Xie et al., "A Theory of Generative ConvNet", arXiv:1602.03264v1, Feb. 10, 2016, 12 pages.

Yang et al., "PointFlow: 3D Point Cloud Generation with Continuous Normalizing Flows", arXiv:1906.12320v1, Jun. 28, 2019, 14 pages.

Yu et al., "Construction of a Large-scale Image Dataset using Deep Learning with Humans in the Loop", arXiv:1506.03365v1, Jun. 10, 2015, 9 pages.

Yu et al., "Training Deep Energy-Based Models with f-Divergence Minimization", Department of Computer Science, arXiv:2003.03463v1, Mar. 6, 2020, 37 pages.

Yu et al., "Inclusive GAN: Improving Data and Minority Coverage in Generative Models", arXiv:2004.03355v3, Aug. 23, 2020, 22 pages.

Zhao et al., "Energy-Based Generative Adversarial Network", arXiv:1609.03126v1, Sep. 11, 2016, 15 pages.

Zhu et al., "Unpaired Image-to-Image Translation using Cycle-Consistent Adversarial Networks", arXiv:1703.10593v1, Mar. 30, 2017, 18 pages.

Arjovsky et al., "Wasserstein GAN", arXiv:1701.07875v3, Dec. 6, 2017, 32 pages.

Barratt et al., "A Note on the Inception Score", arXiv:1801.01973v2, ICML, Jun. 21, 2018, 9 pages.

Brock et al., "Large Scale GAN Training for High Fidelity Natural Image Synthesis", arXiv:1809.11096v1, Sep. 28, 2018, 29 pages.

Che et al., "Your GAN is Secretly an Energy-based Model and You Should Use Discriminator Driven Latent Sampling", 34th Conference on Neural Information Processing Systems, 2020, 13 pages.

Dai et al., "Diagnosing and Enhancing VAE Models", arXiv:1903.05789v2, Oct. 30, 2019, 44 pages.

Dhariwal et al., "Jukebox: A Generative Model for Music", arXiv:2005.00341v1, Apr. 30, 2020, 20 pages.

Dieng et al., "Prescribed Generative Adversarial Networks", arXiv:1910.04302v1, Oct. 9, 2019, 28 pages.

Dinh et al., "Density estimation using Real NVP", arXiv:1605.08803v1, May 27, 2016, 29 pages.

Du et al., "Implicit Generation and Modeling with Energy-Based Models", 33rd Conference on Neural Information Processing Systems, 2019, 11 pages.

Dupont et al., "Augmented Neural ODEs", 33rd Conference on Neural Information Processing Systems, 2019, 11 pages.

Gao et al., "Flow Contrastive Estimation of Energy-Based Models", In Proceedings of the IEEE/CVF Conference on Computer Vision and Pattern Recognition, 2020, pp. 7518-7528.

(56)                    References Cited

OTHER PUBLICATIONS

Ghosh et al., "From Variational to Deterministic Autoencoders", arXiv:1903.12436v1, Mar. 29, 2019, 14 pages.

Goodfellow et al., "Generative Adversarial Nets", Advances in Neural Information Processing Systems, arXiv:1406.2661v1, Jun. 10, 2014, 9 pages.

Grathwohl et al., "Your Classifier is Secretly an Energy Based Model and You Should Treat It Like One", arXiv:1912.03263v1, Dec. 6, 2019, 22 pages.

Grathwohl et al., "Cutting out the Middle-Man: Training and Evaluating Energy-Based Models without Sampling", arXiv:2002. 05616v1, Feb. 13, 2020, 14 pages.

Gutmann et al., "Noise-Contrastive Estimation: A New Estimation Principle for Unnormalized Statistical Models", In Proceedings of the Thirteenth International Conference on Artificial Intelligence and Statistics, vol. 9, 2010, pp. 297-304.

Han et al., "Divergence Triangle for Joint Training of Generator Model, Energy-based Model, and Inference Model", arXiv:1812. 10907v2, Jan. 31, 2019, 13 pages.

Han et al., "Joint Training of Variational Auto-Encoder and Latent Energy-Based Model", In Proceedings of the IEEE/CVF Conference on Computer Vision and Pattern Recognition, arXiv:2006. 06059v1, Jun. 10, 2020, 10 pages.

Heusel et al., "GANs Trained by a Two Time-Scale Update Rule Converge to a Local Nash Equilibrium", 31st Conference on Neural Information Processing Systems, 2017, 12 pages.

Hinton, Geoffrey E., "Training Products of Experts by Minimizing Contrastive Divergence", Neural Computation, vol. 14, No. 8, 2002, pp. 1771-1800.

Hinton, Geoffrey E., "A Practical Guide to Training Restricted Boltzmann Machines", In Neural networks: Tricks of the trade, 2012, pp. 599-619.

Ho et al., "Denoising Diffusion Probabilistic Models", 34th Conference on Neural Information Processing Systems, arXiv:2006. 11239v2, Dec. 16, 2020, 25 pages.

Hoffman et al., "NeuTra-lizing Bad Geometry in Hamiltonian Monte Carlo Using Neural Transport", arXiv:1903.03704v1, Mar. 9, 2019, 9 pages.

Izmailov et al., "Semi-Supervised Learning with Normalizing Flows", arXiv:1912.13025v1, Dec. 30, 2019, 15 pages.

Kanwar et al., "Equivariant Flow-Based Sampling for Lattice Gauge Theory", DOI: 10.1103/PhysRevLett.125.121601, vol. 125, No. 121601, Sep. 2020, pp. 121601-1-121601-6.

Karras et al., "Progressive Growing Of GANs For Improved Quality, Stability, And Variation", arXiv:1710.10196v1, Oct. 27, 2017, 25 pages.

Karras et al., "A Style-Based Generator Architecture for Generative Adversarial Networks", In Proceedings of the IEEE conference on computer vision and pattern recognition, arXiv:1812.04948v3, Mar. 29, 2019, 12 pages.

Karras et al., "Training Generative Adversarial Networks with Limited Data", 34th Conference on Neural Information Processing Systems, arXiv:2006.06676v2, Oct. 7, 2020, 37 pages.

Karras et al., "Analyzing and Improving the Image Quality of StyleGAN", In Proceedings of the IEEE/CVF Conference on Computer Vision and Pattern Recognition, 2020, pp. 8110-8119.

Kingma et al., "Adam: A Method for Stochastic Optimization", arXiv:1412.6980v1, Dec. 22, 2014, 9 pages.

Kingma et al., "Auto-Encoding Variational Bayes", In The International Conference on Learning Representations (ICLR), arXiv:1312. 6114v10, May 1, 2014, 14 pages.

Kingma et al., "Glow: Generative Flow with Invertible 1×1 Convolutions", 32nd Conference on Neural Information Processing Systems, 2018, 10 pages.

Kingma et al., "Semi-supervised Learning with Deep Generative Models", In Advances in neural information processing systems, arXiv:1406.5298v1, Jun. 20, 2014, 9 pages.

Kingma et al., "Improved Variational Inference with Inverse Autoregressive Flow", 29th Conference on Neural Information Processing Systems, arXiv:1606.04934v2, Jan. 30, 2017, 16 pages.

Kong et al., "The Expressive Power of a Class of Normalizing Flow Models", Proceedings of the 23rd International Conference on Artificial Intelligence and Statistics, vol. 108, arXiv:2006.00392v1, May 31, 2020, 29 pages.

Lecun et al., "A Tutorial on Energy-Based Learning", MIT Press, Aug. 2006, 59 pages.

Li et al., "Annealed Denoising Score Matching: Learning Energy-Based Models In High-Dimensional Spaces", arXiv:1910.07762v1, Oct. 17, 2019, 21 pages.

Liang et al., "Enhancing The Reliability of Out-of-Distribution Image Detection in Neural Networks", arXiv:1706.02690, 2017, 27 pages.

Lin et al., "COCO-GAN: Generation by Parts via Conditional Coordinating", ICCV, 2019, pp. 4512-4521.

Lin et al., "PacGAN: The Power of two Samples in Generative Adversarial Networks", 32nd Conference on Neural Information Processing Systems, 2018, 10 pages.

Liu et al., "Hybrid Discriminative-Generative Training via Contrastive Learning", arXiv:2007.09070v1, Jul. 17, 2020, 14 pages.

Liu et al., "Unsupervised Image-to-Image Translation Networks", 31st Conference on Neural Information Processing Systems, 2017, 9 pages.

Liu et al., "Deep Learning Face Attributes in the Wild", In Proceedings of the IEEE international conference on computer vision, 2015, pp. 3730-3738.

Miyato et al., "Spectral Normalization for Generative Adversarial Networks", arXiv:1802.05957v1, Feb. 16, 2018, 26 pages.

Mnih et al., "Learning Nonlinear Constraints with Contrastive Backpropagation", Proceedings of International Joint Conference on Neural Networks, Jul. 31-Aug. 4, 2005, pp. 1302-1307.

Müller et al., "Neural Importance Sampling", https://doi.org/10. 1145/3341156, ACM Transactions on Graphics, vol. 38, No. 5, Article 145, Oct. 2019, pp. 145:1-145:19.

Nalisnick et al., "Do Deep Generative Models Know What They Don't Know?", arXiv:1810.09136v1, Oct. 22, 2018, 19 pages.

Neal, Radford M., "Probabilistic Inference Using Markov Chain Monte Carlo Methods", Sep. 25, 1993, 144 pages.

Nijkamp et al., "On the Anatomy of MCMC-based Maximum Likelihood Learning of Energy-Based Models", arXiv:1903. 12370v1, Mar. 29, 2019, 12 pages.

Nijkamp et al., "Learning Non-Convergent Non-Persistent Short-Run MCMC Toward Energy-Based Model", 33rd Conference on Neural Information Processing Systems, arXiv:1904.09770v4, Nov. 25, 2019, 15 pages.

Non Final Office Action received for U.S. Appl. No. 17/357,728 dated Oct. 11, 2024, 47 pages.

Xiao et al, "Exponential Tilting of Generative Models: Improving Sample Quality by Training and Sampling from Latent Energy", arXiv:2006.08100, Jun. 15, 2020, pp. 1-15.

Du et al, "Implicit Generation and Generalization in Energy-Based Models", 33rd Conference on Neural Information Processing Systems, Mar. 20, 2019, pp. 1-15.

Doersch et al, "Tutorial on Variational Autoencoders", arXiv:1606. 05908, Jun. 19, 2016, pp. 1-22.

Final Office Action received for U.S. Appl. No. 17/357,728 dated Apr. 3, 2025, 39 pages.

Yifeng, Xu, "The Review of Generative Adversarial Network's Theory Models and Applications", DOI:10.3969/j.issn.1671-3699. 2017.03.019, vol. 17, No. 3, May 2017, pp. 81-88.

Non Final Office Action received for U.S. Appl. No. 17/357,728 dated Jul. 30, 2025, 52 pages.

Karagiannakos, Sergios, "How to Generate Images using Autoencoders", AI Summer, retrieved from https://theaisummer.com/Autoencoder/, Sep. 9, 2018, pp. 1-7.

Final Office Action received for U.S. Appl. No. 17/357,728 dated Jan. 23, 2026, 28 pages.

Kim et al., "Deep Directed Generative Models with Energy-Based Probability Estimation", arXiv: 1606.03439, Jun. 10, 2016, pp. 1-9.

* cited by examiner

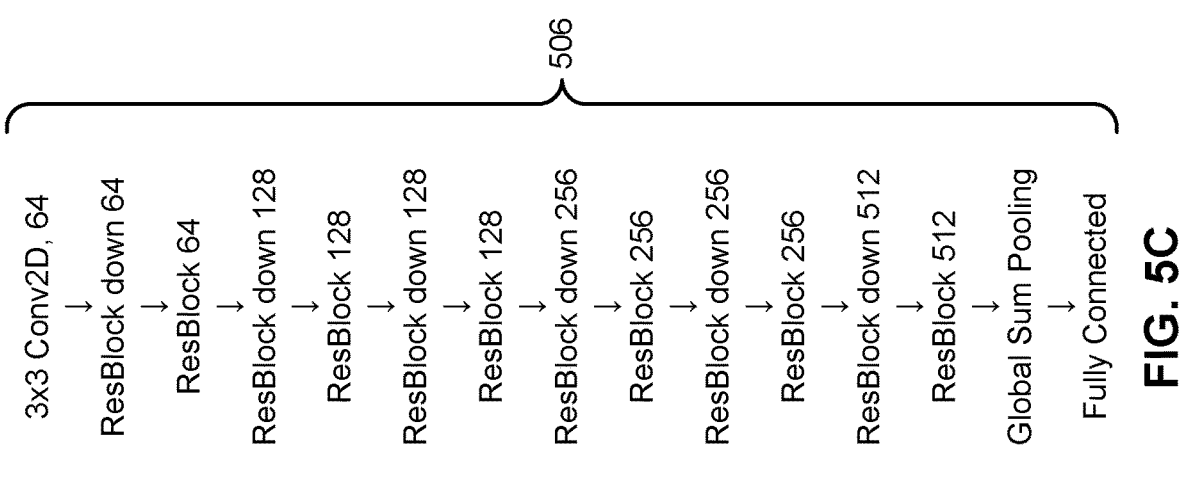

3x3 Conv2D, 64 → ResBlock down 64 → ResBlock 64 → ResBlock down 128 → ResBlock 128 → ResBlock down 128 → ResBlock 128 → ResBlock down 256 → ResBlock 256 → ResBlock down 256 → ResBlock 256 → ResBlock down 512 → ResBlock 512 → Global Sum Pooling → Fully Connected

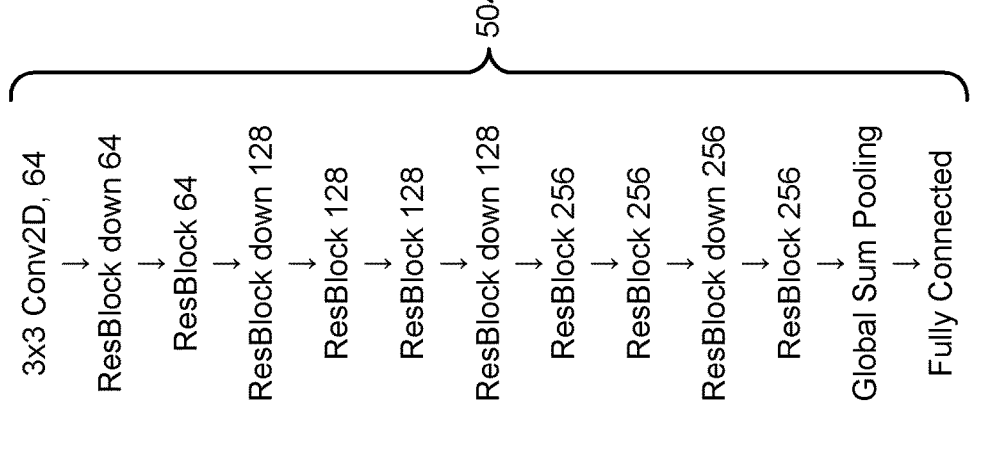

3x3 Conv2D, 64 → ResBlock down 64 → ResBlock 64 → ResBlock down 128 → ResBlock 128 → ResBlock 128 → ResBlock down 128 → ResBlock 256 → ResBlock 256 → ResBlock down 256 → ResBlock 256 → Global Sum Pooling → Fully Connected

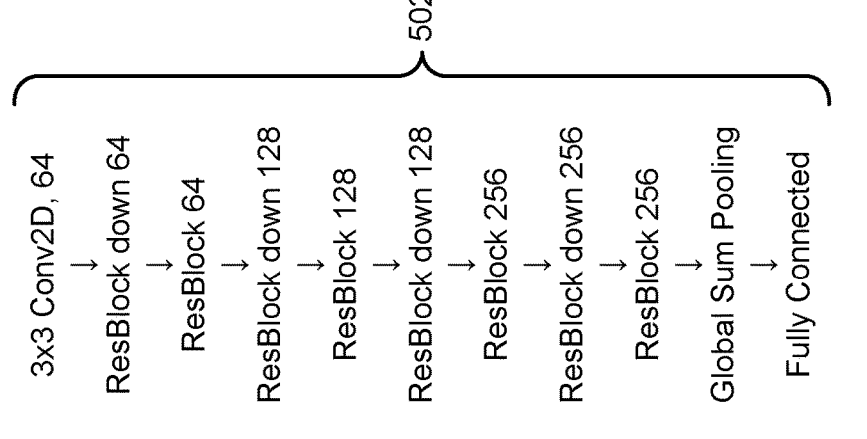

3x3 Conv2D, 64 → ResBlock down 64 → ResBlock 64 → ResBlock down 128 → ResBlock 128 → ResBlock down 128 → ResBlock 256 → ResBlock down 256 → ResBlock 256 → Global Sum Pooling → Fully Connected

TRAINING ENERGY-BASED VARIATIONAL AUTOENCODERS

CROSS-REFERENCE TO RELATED APPLICATIONS

This application claims benefit of United States Provisional patent application titled "ENERGY-BASED VARIATIONAL AUTOENCODERS," filed Sep. 25, 2020 and having Ser. No. 63/083,654. The subject matter of this related application is hereby incorporated herein by reference.

BACKGROUND

Field of the Various Embodiments

Embodiments of the present disclosure relate generally to machine learning and computer science, and more specifically, to techniques for training energy-based variational autoencoders.

Description of the Related Art

In machine learning, generative models typically include deep neural networks and/or other types of machine learning models that are trained to generate new instances of data. For example, a generative model could be trained on a training dataset that includes a large number of images of cats. During training, the generative model "learns" the visual attributes of the various cats depicted in the images. These learned visual attributes could then be used by the generative model to produce new images of cats that are not found in the training dataset.

A variational autoencoder (VAE) is a type of generative model. A VAE typically includes an encoder network that is trained to convert data points in the training dataset into values of "latent variables," where each latent variable represents an attribute of the data points in the training dataset. The VAE also includes a prior network that is trained to learn a distribution of the latent variables associated with the training dataset, where the distribution of latent variables represents variations and occurrences of the different attributes in the training dataset. The VAE further includes a decoder network that is trained to convert the latent variable values generated by the encoder network back into data points that are substantially identical to data points in the training dataset. After training has completed, new data that is similar to data in the original training dataset can be generated using the trained VAE, by selecting latent variable values from the distribution learned by the prior network during training, converting those selected values, via the decoder network, into distributions of values of the data points; and selecting values of the data points from the distributions. Each new data point generated in this manner can include attributes that are similar (but not identical) to one or more attributes of the data points in the training dataset.

For example, a VAE could be trained on a training dataset that includes images of cats, where each image includes tens of thousands to millions of pixels. The trained VAE would include an encoder network that converts each image into hundreds or thousands of numeric latent variable values. Each latent variable would represent a corresponding visual attribute found in one or more of the images used to train the VAE (e.g., appearances of the cats' faces, fur, bodies, expressions, poses, etc. in the images). Variations and occurrences in the visual attributes across all images in the training dataset would be captured by the prior network as a corresponding distribution of latent variables (e.g., as means, standard deviations, and/or other summary statistics associated with the numeric latent variable values). After training has completed, additional images of cats that are not included in the training dataset could be generated by selecting latent variable values from the distribution of latent variables learned by the prior network, converting the latent variable values via the decoder network into distributions of pixel values, and sampling pixel values from the distributions generated by the decoder network to form the additional images of cats.

One drawback of using VAEs to generate new data is that VAEs oftentimes assign high probabilities to regions within the distribution of data point values generated by the decoder network that actually have low probabilities within the distribution of data points in the training dataset. These regions of erroneously high probabilities within the distribution of data point values generated by the decoder network correspond to regions of erroneously high probabilities within the distribution of latent variables learned by the prior network. The regions of erroneously high probabilities in the distribution of latent variables learned by the prior network result from the inability of the prior network to learn complex or "expressive" distributions of latent variable values. Because the high probability regions within the distribution of data point values generated by the decoder network or within the distribution of latent variables learned by the prior network may not accurately capture the attributes of actual data points in the training set, new data points generated by selecting latent variable values from regions of erroneously high probabilities in the distribution of latent variables learned by the prior network, converting the selected latent variable values via the decoder network into distributions of pixel values that include corresponding regions of erroneously high probabilities, and sampling pixel values from the distributions of pixel values oftentimes do not resemble the data in the training dataset.

Continuing with the above example, the training dataset that includes images of cats would be converted by the encoder in a VAE, during training, into latent variable values. These latent variables would then be converted by the decoder in the VAE, during training, into distributions of pixel values that assign high probabilities to the pixel values in the images. Accordingly, pixel values that are sampled from the distribution of pixel values generated by the decoder from those latent variable values should result in images that strongly resemble the images in the training dataset.

However, the distribution of latent variable values learned by the prior network could assign high probabilities to one or more regions that do not include any latent variable values generated by the encoder from images in the training dataset. In such a case, the high probabilities assigned to the region(s) would be errant and would incorrectly indicate that the region(s) include latent variable values that correspond to the visual attributes of the actual training data. As noted above, these region(s) could be caused by a distribution of latent variables learned by the prior network that is simpler than, or not as "expressive," as the actual distribution of latent variable values produced by the encoder network. When latent variable values are selected from these region(s), the decoder network could generate, from the selected latent variable values, a distribution of pixel values that also assigns high probabilities to certain pixel values that do not accurately reflect the visual attributes of the images in the training dataset. A new image that is generated by selecting from this distribution of pixel values could include the pixel values with erroneously high probabilities, which could cause the image to include areas that are blurry, smeared, distorted, incorrectly textured, disjointed, or otherwise do not resemble the images of cats in the training dataset.

One approach to resolving the mismatch between the distribution of latent variable values learned by the prior network and the actual distribution of latent variable values produced by the encoder network from the training dataset, and the corresponding mismatch between the distribution of data point values generated by the decoder network and the actual distribution of data point values in the training dataset, is to implement an energy-based model trained with an iterative Markov Chain Monte Carlo (MCMC) sampling technique to learn a more complex or "expressive" distribution of latent variable values and/or data point values to represent the training dataset. However, each MCMC sampling step depends on the result of a previous sampling step, which prevents MCMC sampling operations from being performed in parallel. Further, a relatively large number of MCMC sampling steps is typically required for the energy-based model to achieve sufficient accuracy. Performing a larger number of MCMC sampling steps serially is both computationally inefficient and quite time-consuming.

As the foregoing illustrates, what is needed in the art are more effective techniques for generating new data using variational autoencoders.

SUMMARY

One embodiment of the present invention sets forth a technique for creating a generative model. The technique includes performing one or more operations based on a training dataset to generate a trained generative model that includes a first component that converts a plurality of data points included in the training dataset into a set of latent variable values, a second component that learns a distribution of the set of latent variable values across the training dataset, and a third component that converts one or more latent variable values into one or more output distributions. The technique also includes performing one or more operations to train an energy-based model to learn an energy function based on a first set of values sampled from one or more first distributions associated with the training dataset and a second set of values sampled from one or more second distributions used during operation of one or more portions of the trained generative model. The technique further includes creating a joint model that includes the one or more portions of the trained generative model and the energy-based model, wherein the joint model applies one or more energy values generated via the energy-based model to a third set of values sampled from the one or more second distributions to produce a fourth set of values, where, in operation, the joint model produces the fourth set of values in order to generate a new data point that is not included in the training dataset.

At least one technical advantage of the disclosed techniques relative to the prior art is that the disclosed techniques produce generative output that looks more realistic and similar to the data in a training dataset compared to what is typically produced using conventional variational autoencoders. Another technical advantage is that, with the disclosed techniques, a complex distribution of values representing a training dataset can be approximated by a joint model that is trained and executed in a more computationally efficient manner relative to prior art techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5A illustrates an exemplar architecture for the energy-based model of FIG. 2, according to various embodiments.

FIG. 5B illustrates an exemplar architecture for the energy-based model of FIG. 2, according to other various embodiments.

FIG. 5C illustrates an exemplar architecture for the energy-based model of FIG. 2, according to yet other various embodiments.

DETAILED DESCRIPTION

Figure 1:
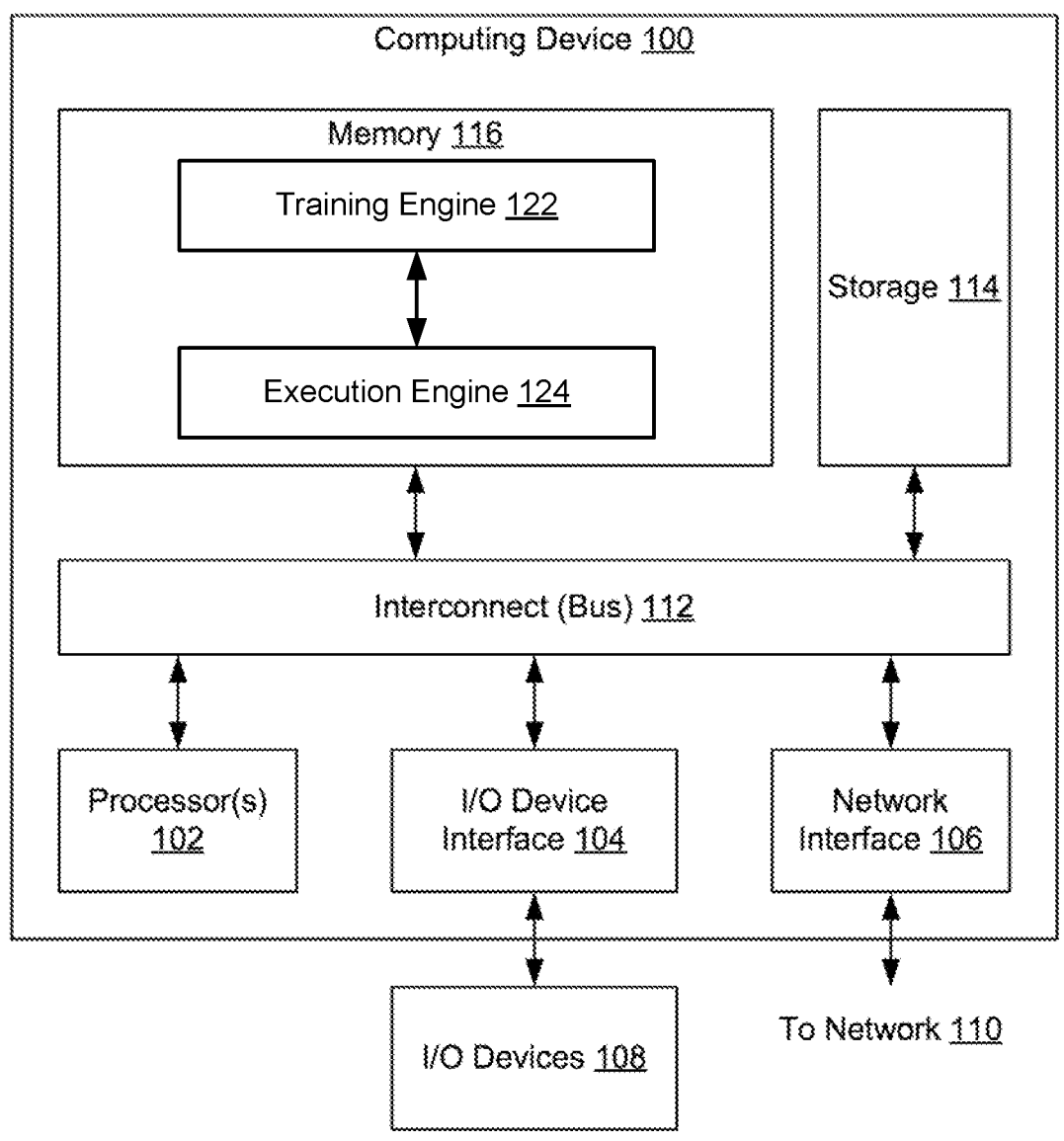
FIG. 1 illustrates a computing device configured to implement one or more aspects of the various embodiments.

In the following description, numerous specific details are set forth to provide a more thorough understanding of the various embodiments. However, it will be apparent to one of skill in the art that the inventive concepts may be practiced without one or more of these specific details.

General Overview

A variational autoencoder (VAE) is a type of machine learning model that is trained to generate new instances of data after "learning" the attributes of data found within a training dataset. For example, a VAE could be trained on a dataset that includes a large number of images of cats. During training of the VAE, the VAE learns patterns in the faces, fur, bodies, expressions, poses, and/or other visual attributes of the cats in the images. These learned patterns allow the VAE to produce new images of cats that are not found in the training dataset.

A VAE includes a number of neural networks. These neural networks can include an encoder network that is trained to convert data points in the training dataset into values of "latent variables," where each latent variable represents an attribute of the data points in the training dataset. These neural networks can also include a prior network that is trained to learn a distribution of the latent variables associated with the training dataset, where the distribution of latent variables represents variations and occurrences of the different attributes in the training dataset. These neural networks can additionally include a decoder network that is trained to convert the latent variable values generated by the encoder network back into data points that are substantially identical to data points in the training dataset. After training has completed, new data that is similar to data in the original training dataset can be generated using the trained VAE, by sampling latent variable values from the distribution learned by the prior network during training and converting those sampled values, via the decoder network, into distributions of values of the data points; and sampling values of the data points from the distributions. Each new data point generated in this manner can include attributes that are similar (but not identical) to one or more attributes of the data points in the training dataset.

For example, a VAE could be trained on a training dataset that includes images of cats, where each image includes tens of thousands to millions of pixels. The trained VAE would include an encoder network that converts each image into hundreds or thousands of numeric latent variable values. Each latent variable would represent a corresponding visual attribute found in one or more of the images used to train the VAE (e.g., appearances of the cats' faces, fur, bodies, expressions, poses, etc. in the images). Variations and occurrences in the visual attributes across all images in the training dataset would be captured by the prior network as a corresponding distribution of latent variables (e.g., as means, standard deviations, and/or other summary statistics associated with the numeric latent variable values). After training has completed, additional images of cats that are not included in the training dataset could be generated by selecting latent variable values from the distribution of latent variables learned by the prior network, converting the latent variable values via the decoder network into distributions of pixel values, and sampling pixel values from the distributions generated by the decoder network to form the additional images of cats.

VAEs can be used in various real-world applications. First, a VAE can be used to produce images, text, music, and/or other content that can be used in advertisements, publications, games, videos, and/or other types of media. Second, VAEs can be used in computer graphics applications. For example, a VAE could be used to render two-dimensional (2D) or three-dimensional (3D) characters, objects, and/or scenes instead of requiring users to explicitly draw or create the 2D or 3D content. Third, VAEs can be used to generate or augment data. For example, the appearance of a person in an image (e.g., facial expression, gender, facial features, hair, skin, clothing, accessories, etc.) could be altered by adjusting latent variable values outputted by the encoder network in a VAE from the image and using the decoder network from the same VAE to convert the adjusted values into a new image. In another example, the prior and decoder networks in a trained VAE could be used to generate new images that are included in training data for another machine learning model. Fourth, VAEs can be used analyze or aggregate the attributes of a given training dataset. For example, visual attributes of faces, animals, and/or objects learned by a VAE from a set of images could be analyzed to better understand the visual attributes and/or improve the performance of machine learning models that distinguish between different types of objects in images.

To assist a VAE in generating new data that accurately captures attributes found within a training dataset, the VAE is first trained on the training dataset. During training of the VAE, the prior network learns a distribution of latent variables that captures "higher-level" attributes in the training dataset, and the decoder network learns to convert samples from the distribution of latent variables into distributions of data point values that reflect these higher-level attributes. After training of the VAE is complete, a separate machine learning model called an energy-based model is trained to learn "lower-level" attributes in the training dataset. The trained energy-based model includes an energy function that outputs a low energy value when a sample from one or more distributions of data point values outputted by the decoder network of the VAE has high probability in the actual distribution of data point values in the training dataset. The energy function outputs a high energy value when the sample has low probability in the actual distribution of data point values in the training dataset. In other words, the energy-based model learns to identify how well the sample reflects the actual distribution of data point values in the training dataset.

For example, the VAE could first be trained to learn shapes, sizes, locations, and/or other higher-level visual attributes of eyes, noses, ears, mouths, chins, jaws, hair, accessories, and/or other parts of faces in images included in the training dataset. Next, the energy-based model could be trained to learn lower-level visual attributes related to textures, sharpness, or transitions across different areas within the images included in the training dataset. The trained energy-based model would then produce a low energy value if an image composed of pixel values sampled from a distribution of pixel values generated by the decoder network of the VAE from latent variable values sampled from a distribution learned by the prior network of the VAE had a high probability in the distribution of pixel values across images in the training dataset. Conversely, the trained energy-based model would produce a high energy value if an image composed of pixel values sampled from the distribution of pixel values generated by the decoder network from latent variables sampled from the distribution learned by the prior network had a low probability in the distribution of pixel values across images in the training dataset.

The trained VAE and energy-based model can then be used together in a joint model that produces generative output that resembles the data in the training dataset. In particular, one or more distributions used in operation of the VAE are sampled to generate a first set of values. The energy-based model is then applied to the first set of values to generate one or more energy values that reflect the probability that the first set of values is sampled from one or more corresponding distributions associated with the training dataset. These energy values are then used to adjust the first set of values so that "non-data-like" regions that fail to capture or reflect attributes of the data in the training dataset are omitted from the output of the joint model.

For example, the first set of values could include a set of pixel values in an image. These pixel values could be generated by sampling from one or more distributions of pixel values outputted by the decoder network in the VAE, after one or more values sampled from the distribution of latent variables learned by the prior network in the VAE are inputted into the decoder network. Next, the pixel values could be inputted into the energy-based model to generate one or more energy values that indicate how well the image "fits" into the distribution of pixel values in the training dataset used to train the VAE and energy-based model. A Markov Chain Monte Carlo (MCMC) sampling technique could then be used to iteratively update the pixel values in the image based on the corresponding energy values, so that over time the energy values are minimized and the pixel values in the image better capture the visual attributes of the images in the training dataset.

In another example, the output of the decoder network could be represented using deterministic transformations of a first set of values that is sampled from one or more noise distributions. These noise distributions could include one or more Normal distributions from which samples are drawn during operation of the VAE. The first set of values could then be injected into the prior and/or decoder networks in the VAE to produce latent variable values and/or pixel values in an output image, respectively. Thus, the energy-based model could be applied to the first set of values to generate one or more energy values that indicate how well the corresponding latent variable values and/or pixel values reflect the distributions of latent variables and/or distributions of pixel values associated with the training dataset used to train the VAE and energy-based model. A MCMC sampling technique could then be used to iteratively update the first set of values based on the corresponding energy values. These MCMC iterations minimize the energy values and transform the first set of values into a second set of values that can be converted into an image that better reflects the visual attributes of the images in the training dataset than the first set of values.

System Overview

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and execution engine 124 that reside in a memory 116. It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of receiving input, such as a keyboard, a mouse, a touchpad, and/or a microphone, as well as devices capable of providing output, such as a display device and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

Training engine 122 includes functionality to train a variational autoencoder (VAE) on a training dataset, and execution engine 124 includes functionality to execute one or more portions of the VAE to generate additional data that is not found in the training dataset. For example, training engine 122 could train encoder, prior, and/or decoder networks in the VAE on a set of training images, and execution engine 124 may execute a generative model that includes the trained prior and decoder networks to produce additional images that are not found in the training images.

In some embodiments, training engine 122 and execution engine 124 use a number of techniques to mitigate mismatches between the distribution of data point values outputted by the decoder network in the VAE based on samples from the distribution of latent variables learned by the prior network from the training dataset and the actual distribution of data point values in the training dataset. More specifically, training engine 122 and execution engine 124 learn to identify and avoid regions in the distribution of data point values outputted by the decoder network that do not correspond to actual attributes of data in the training dataset. As described in further detail below, this improves the generative performance of the VAE by increasing the likelihood that generative output produced by the VAE captures attributes of data in the training dataset.

Energy-Based Variational Autoencoder

Figure 2:
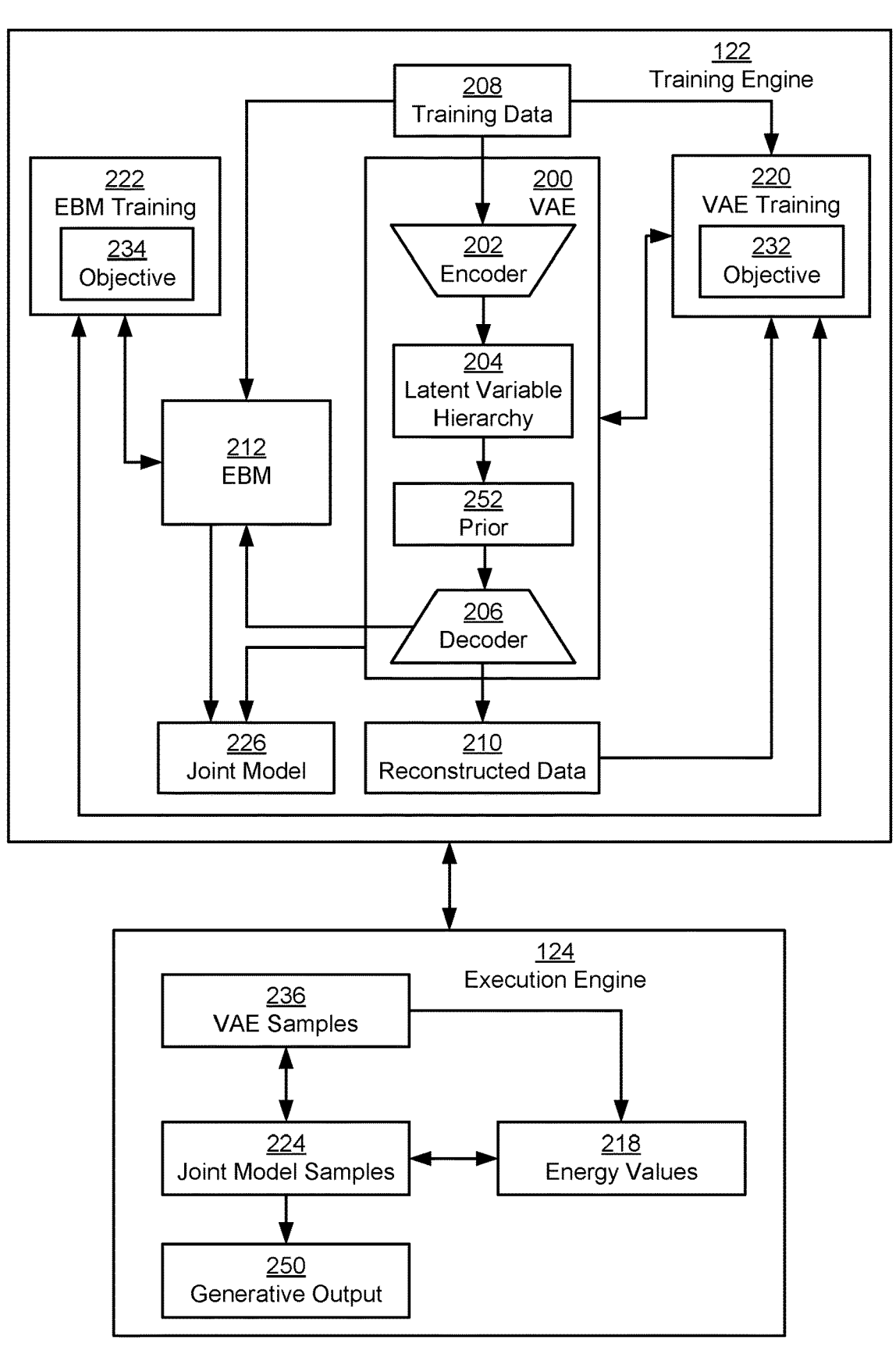
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. Training engine 122 trains a VAE 200 that learns a distribution of a set of training data 208, and execution engine 124 executes one or more portions of VAE 200 to produce generative output 250 that includes additional data points in the distribution that are not found in training data 208.

As shown, VAE 200 includes a number of neural networks: an encoder 202, a prior 252, and a decoder 206. Encoder 202 "encodes" a set of training data 208 into latent variable values, prior 252 learns the distribution of latent variables outputted by encoder 202, and decoder 206 "decodes" latent variable values sampled from the distribution into reconstructed data 210 that substantially reproduces training data 208. For example, training data 208 could include images of human faces, animals, vehicles, and/or other types of objects; speech, music, and/or other audio; articles, posts, written documents, and/or other text; 3D point clouds, meshes, and/or models; and/or other types of content or data. When training data 208 includes images of human faces, encoder 202 could convert pixel values in each image into a smaller number of latent variables representing inferred visual attributes of the objects and/or images (e.g., skin tones, hair colors and styles, shapes and sizes of facial features, gender, facial expressions, and/or other characteristics of human faces in the images), prior 252 could learn the means and variances of the distribution of latent variables across multiple images in training data 208, and decoder 206 could convert latent variables sampled from the latent variable distribution and/or outputted by encoder 202 into reconstructions of images in training data 208.

The generative operation of VAE 200 may be represented using the following probability model:

$$p_\Theta(x,z) = p_\Theta(z)p_\Theta(x|z), \quad (1)$$

where $p_\Theta(z)$ is a prior distribution learned by prior 252 over latent variables z and $p_\Theta(x|z)$ is the likelihood function, or decoder 206, that generates data x given latent variables z. In other words, latent variables are sampled from prior 252 $p_\Theta(z)$, and the data x has a likelihood that is conditioned on the sampled latent variables z. The probability model includes a posterior $p_\Theta(z|x)$, which is used to infer values of the latent variables z. Because $p_\Theta(z|x)$ is intractable, another distribution $q_\phi(z|x)$ learned by encoder 202 is used to approximate $p_\Theta(z|x)$.

As shown, training engine 122 performs one or more rounds of VAE training 220 that update parameters of encoder 202, prior 252, and decoder 206 based on an objective 232 that is calculated based on the probability model representing VAE 200 and an error between training data 208 (e.g., a set of images, text, audio, video, etc.) and reconstructed data 210. In one or more embodiments, objective 232 includes a variational lower bound on log $p_\Theta(x)$ to be maximized:

$$\log p_\Theta(x) \geq \mathbb{E}_{z \sim q_\phi(z|x)}[\log p_\Theta(x|z) - D_{KL}[q_\phi(z|x)\|p_\Theta(z)]:=$$
$$\mathcal{L}_{vae}(x,\theta,\phi) \quad (2)$$

where $q_\phi(z|x)$ is the approximate posterior learned by encoder 202 and KL is the Kullback-Leibler (KL) divergence.

In some embodiments, VAE 200 is a hierarchical VAE that uses deep neural networks for encoder 202, prior 252, and decoder 206. The hierarchical VAE includes a latent variable hierarchy 204 that partitions latent variables into a sequence of disjoint groups. Within latent variable hierarchy 204, a sample from a given group of latent variables is combined with a feature map and passed to the following group of latent variables in the hierarchy for use in generating a sample from the following group.

Continuing with the probability model represented by Equation 1, partitioning of the latent variables may be represented by $z=\{z_1, z_2, \ldots, z_K\}$, where K is the number of groups. Within latent variable hierarchy 204, prior 252 is represented by $p_\Theta(z)=\prod_k p(z_l|z_{<k})$, and the approximate posterior is represented by $q_\phi(z|x)=\prod_k q(z_k|z_{<k}, x)$, where each conditional $p(z_l|z_{<k})$ in the prior and each conditional $q(z_k|z_{<k}, x)$ in the approximate posterior can be represented by factorial Normal distributions. In addition, $q(z_{<k}) \triangleq \mathbb{E}_{p_d(x)}[q(z_{<K}|x)]$ is the aggregate approximate posterior up to the (k−1)th group, and $q(z_k|z_{<k}) \triangleq \mathbb{E}_{p_d(x)}[q(z_k|z_{<k}, x)]$ is the aggregate conditional distribution for the kth group.

In some embodiments, encoder 202 includes a bottom-up model and a top-down model that perform bidirectional inference of the groups of latent variables based on training data 208. The top-down model is then reused as prior 252 to infer latent variable values that are inputted into decoder 206 to produce reconstructed data 210 and/or generative output 250. The architectures of encoder 202 and decoder 206 are described in further detail below with respect to FIGS. 3A-3B.

When VAE 200 is a hierarchical VAE that includes latent variable hierarchy 204, objective 232 includes an evidence lower bound to be maximized with the following form:

$$\mathcal{L}_{HVAE}(x) := \mathbb{E}_{q(z|x)}[\log p(x|z)] - \quad (3)$$
$$\sum_{k=1}^{K} \mathbb{E}_{q(z_{<k}|x)}[KL(q(z_k|z_{<k}, x)\|p(z_k|z_{<k}))]$$

where $$q(z_{<k}|x) = \prod_{i=1}^{k-1} q(z_i|z_{<i}, x)$$

is the approximate posterior up to the (k−1)th group. In addition, log p(x|z) is the log-likelihood of observed data x given the sampled latent variables z; this term is maximized when p(x|z) assigns high probability to the original data x (i.e., when decoder 206 tries to reconstruct a data point x in training data 208 given latent variables z generated by encoder 202 from the data point). The "KL" terms in the equation represent KL divergences between the posteriors at different levels of latent variable hierarchy 204 and the corresponding priors (e.g., as represented by prior 252). Each $KL(q(z_k|z_{<k}, x)\|p(z_k|z_{<k}))$ can be considered the amount of information encoded in the kth group. The reparametrization trick may be used to backpropagate with respect to parameters of encoder 202 through objective 232.

Those skilled in the art will appreciate that prior 252 may fail to match the aggregate approximate posterior distribution outputted by encoder 202 from training data 208 after VAE training 220 is complete. In particular, the aggregate approximate posterior can be denoted by $q(z) \triangleq \mathbb{E}_{p_d(x)}[q(z|x)]$. During VAE training 220, maximizing objective 232 $\mathcal{L}_{vae}(x, \theta, \phi)$ with respect to the parameters of prior 252 corresponds to bringing prior 252 as close as possible to the aggregate approximate posterior by minimizing $KL(q_\phi(z) \| p_\Theta(z))$ with respect to $p_\Theta(z)$. However, prior 252 $p_\Theta(z)$ is unable to exactly match the aggregate approximate posterior $q_\phi(z)$ at the end of VAE training 220 (e.g., because prior 252 is not expressive enough to capture the aggregate approximate posterior). Because of this mismatch, the distribution of latent variables learned by prior 252 from training data 208 can assign high probabilities to regions in the latent space occupied by latent variables z that do not correspond to any samples in training data 208. In turn, decoder 206 converts samples from these regions into a data likelihood that assigns high probabilities to certain data values, when these data values have low probability in training data 208. In other words, if latent variable values were selected from regions in prior 252 that failed to match the actual distribution of latent variables produced by encoder 202 from training data 208 (i.e., the aggregate approximate posterior), generative output 250 produced by sampling from the data likelihood generated by decoder 206 from the selected latent variable values would fail to resemble training data 208.

In one or more embodiments, training engine 122 is configured to reduce the mismatch between the distribution of data values in training data 208 and the likelihood outputted by decoder 206 from latent variable values sampled from prior 252. More specifically, training engine 122 creates a joint model 226 that includes VAE 200 and an energy-based model (EBM) 212. EBM 212 is represented by $p_\psi(x)$, which is assumed to be a Gibbs distribution with the following form:

$$p_\psi(x) = \exp(-E_\psi(x))/Z_{104}, \tag{4}$$

where $E_\psi(x)$ is an energy function with parameters $\psi$ and $Z_\psi = \int_x \exp(-E_\psi(x))dx$ is a normalization constant.

In some embodiments, EBM 212 is trained using a contrastive method such as Maximum Likelihood Learning. Maximum Likelihood Learning includes a goal of maximizing the log-likelihood $L(\psi) = \mathbb{E}_{x \sim p_d(x)}[\log p_\psi(x)]$, which has the following derivative:

$$\partial_\psi L(\psi) = \mathbb{E}_{x \sim p_d(x)}[-\partial_\psi E_\psi(x)] + \mathbb{E}_{x \sim p_\psi(x)}[\partial_\psi E_\psi(x)] \tag{5}$$

For the first expectation, Maximum Likelihood Learning includes a positive phase, in which samples are drawn from the data distribution $p_d(x)$. For the second expectation, Maximum Likelihood Learning includes a negative phase, in which samples are drawn from EBM 212 $p_\psi(x)$.

Because sampling from $p_\psi(x)$ in the negative phase is intractable, approximate samples are usually drawn using Markov Chain Monte Carlo (MCMC). For example, an MCMC technique such as Langevin dynamics (LD) could be used to iteratively update an initial sample $x_0$ using the following:

$$x_{t+1} = x_t - \frac{\eta}{2} \nabla_x E_\psi(x_t) + \sqrt{\eta}\, \omega_t, \tag{6}$$

$$\omega_t \sim \mathcal{N}(0, I),$$

where $\eta$ is the step size. After a certain number of iterations, Equation 5 yields a Markov chain with an invariant distribution that is approximately close to the original target distribution.

In one or more embodiments, joint model 226 includes the following form:

$$h_{\psi,\theta}(x, z) = \frac{1}{Z_{\psi,\theta}} p_\theta(x, z) e^{-E_\psi(x)} \tag{7}$$

In Equation 7, $p_\Theta(x, z) = p_\Theta(z)p_\Theta(x|z)$ is a generator in VAE 200, $E_\psi(x)$ is a neural-network-based energy function in EBM 212 that operates only in the x space, and $Z_{\psi, \theta} = \int p_\theta(x)e^{-E_\psi(x)}d_x$ is a normalization constant. Marginalizing out the latent variable z gives:

$$h_{\psi,\theta}(x) = \frac{1}{Z_{\psi,\theta}} \int p_\theta(x, z) e^{-E_\psi(x)} dz = \frac{1}{Z_{\psi,\theta}} p_\theta(x) e^{-E_\psi(x)} \tag{8}$$

Given a set of training data 208, training engine 122 trains the parameters $\psi$, $\Theta$ of joint model 226 to maximize the marginal log-likelihood on training data 208:

$$\log h_{\psi,\theta}(x) = \log p_\theta(x) - E_\psi(x) - \log Z_{\psi,\theta} \tag{9}$$

$$\geq \mathbb{E}_{z \sim q_\phi(z|x)}[\log p_\theta(x|z)] - D_{KL}(q_\phi(z|x)\|p(z)) - \underbrace{E_\psi(x) - \log Z_{\psi,\theta}}_{\mathcal{L}_{EBM}(x,\psi,\theta)}, \tag{10}$$

where the two terms grouped under $\mathcal{L}_{vae}(x,\theta,\phi)$ where $\log p_\Theta(x)$ is replaced with the variational lower bound in Equation 2. Equation 10 represents the objective function for training joint model 226. Within Equation 10, the first two terms grouped under $\mathcal{L}_{vae}(x, \theta, \phi)$ correspond to objective 232 for VAE training 220, and the last two terms grouped under $\mathcal{L}_{EBM}(x, \psi, \theta)$ correspond to an objective 234 for EBM training 222.

In Equation 10, the $\mathcal{L}_{EBM}(x, \psi, \theta)$ term is similar to a normal EBM training 222 objective, except that the log function depends on both $\psi$ and $\Theta$. In addition, $\log Z_{\psi,\Theta}$ has the following gradients:

$$\partial_\psi \log Z_{\psi,\theta} = \mathbb{E}_{x \sim h_{\psi,\theta}(x,z)}[-\partial_\psi E_\psi(x)] \text{ and } \partial_\theta \log Z_{\psi,\theta} = \mathbb{E}_{x \sim h_{\psi,\theta}(x,z)}[\partial_\theta \log p_\theta(x)] \tag{11}$$

The derivative of $\log Z_{\psi, \Theta}$ with respect to $\Theta$ can be derived using the following:

$$\frac{\partial}{\partial \theta} \log Z_{\psi,\theta} = \frac{\partial}{\partial \theta} \log\left(\int p_\theta(x) e^{-E_\phi(x)} dx\right) \tag{12}$$

$$= \frac{1}{Z_{\psi,\theta}} \int \frac{\partial p_\theta(x)}{\partial \theta} e^{-E_\phi(x)} dx$$

$$= \frac{1}{Z_{\psi,\theta}} \int p_\theta(x) e^{-E_\phi(x)} \frac{\partial \log p_\theta(x)}{\partial \theta} dx$$

$$= \int h_{\psi,\theta}(x) \frac{\partial \log p_\theta(x)}{\partial \theta} dx$$

$$= \mathbb{E}_{x \sim h_{\phi,\theta}(x,z)}\left[\frac{\partial \log p_\theta(x)}{\partial \theta}\right]$$

A similar derivation can be used to produce the following derivative of $\log Z_{\psi,\Theta}$ with respect to $\psi$:

$$\frac{\partial}{\partial \psi} \log Z_{\psi,\theta} = \mathbb{E}_{x \sim h_{\psi,\theta}(x,z)}\left[-\frac{\partial E_\psi(x)}{\partial \psi}\right] \tag{13}$$

Equation 12 can further be expanded to the following:

$$\frac{\partial}{\partial \psi} \log Z_{\psi,\theta} = \mathbb{E}_{x \sim h_{\psi,\theta}(x,z)} \left[ \mathbb{E}_{z' \sim p_{\theta}(z'|x)} \left[ \frac{\partial \log p_{\theta}(x, z')}{\partial \theta} \right] \right] \quad (14)$$

Equation 14 is intractable but can be approximated by first sampling from joint model 226 using MCMC (i.e., $x \sim h_{\psi,\Theta}(x, z)$), and then sampling from the true posterior of VAE 200 (i.e., $z' \sim p_{\Theta}(z'|x)$).

One approach to drawing approximate samples from $p_{\Theta}(z'|x)$ includes replacing $p_{\Theta}(z'|x)$ with the approximate posterior $q_{\phi}(z'|x)$. However, the quality of these approximate samples depends on how well $q_{\phi}(z'|x)$ matches the true posterior on samples generated by $h_{\psi,\Theta}(x, z)$. To bring $q_{\phi}(z'|x)$ closer to $p_{\Theta}(z'|x)$, the variational bound on samples generated from $h_{\psi,\Theta}(x, z)$ can be maximized with respect to encoder 202 parameters $\phi$.

Alternatively, MCMC can be used to sample $z' \sim p_{\Theta}(z'|x)$. To speed up MCMC, the z' samples can be initialized with the original z samples drawn in the outer expectation (i.e., x, $z \sim h_{\psi,\Theta}(x, z)$). With this approach, MCMC is performed twice, once for x, $z \sim h_{\psi,\Theta}(x, z)$ and another time for $z' \sim p_{\Theta}(z'|x)$.

In one or more embodiments, training engine 122 reduces computational complexity associated with estimating $$\frac{\partial}{\partial \theta} \log p_{\theta}(x)$$

by holding the parameters of VAE 200 fixed while training EBM 212. More specifically, training engine 122 performs a first stage of VAE training 220 by maximizing the $\mathcal{L}_{vae}(x, \theta, \phi)$ term that corresponds to objective 232 in Equation 9. Training engine 122 then freezes the parameters of encoder 202, prior 252, and decoder 206 in VAE 200 and performs a second stage of EBM training 222.

During the second stage of EBM training 222, training engine 122 performs MCMC to sample $x \sim h_{\psi,\Theta}(x, z)$, compute $$\frac{\partial}{\partial \psi} \log Z_{\psi,\theta},$$

and optimize the $\mathcal{L}_{EBM}(x, \psi, \theta)$ term that corresponds to objective 234 with respect to the parameters of the energy function $\psi$. The gradient of $L(\psi) = \mathbb{E}_{x \sim pA}[\mathcal{L}_{EBM}(x, \psi, \theta)]$ with respect to $\psi$ is:

$$\partial_{\psi} L(\psi) = \mathbb{E}_{x \sim p_d(x)}[-\partial_{\psi} E_{\psi}(x)] + \mathbb{E}_{x \sim h_{\psi,\theta}(x,z)}[\partial_{\psi} E_{\psi}(x)] \quad (15)$$

which decomposes into a positive phase and a negative phase, as discussed above with respect to Equation 5.

This two-stage training approach includes a number of advantages. First, by performing VAE training 220 and EBM training 222 in two distinct stages, training engine 122 reduces computational complexity associated with estimating the full gradient of $\log Z_{\psi,\Theta}$. Second, the first stage of VAE training 220 minimizes the distance between VAE 200 and the distribution of training data 208, which reduces the number of MCMC updates used to train EBM 212 in the second stage of EBM training 222. Third, pre-training of VAE 200 produces a latent space with an effectively lower dimensionality and a smoother distribution than the distribution of training data 208, which further improves the efficiency of the MCMC technique used to train EBM 212.

To perform gradient estimation in the negative phase, training engine 122 may draw samples from joint model 226 using MCMC. For example, training engine 122 could use ancestral sampling to first sample from prior 252 $p_{\Theta}(z)$ and then run MCMC for $p_{\theta}(x|z)e^{-E_{\psi}(x)}$ in x-space. However, $p_{\Theta}(x|z)$ is often sharp and interferes with gradient estimation, and MCMC cannot mix when the conditioning z is fixed.

In one or more embodiments, training engine 122 performs EBM training 222 by reparameterizing both x and z and running MCMC iterations in the joint space of z and x. More specifically, training engine 122 performs this reparameterization by sampling from a fixed noise distribution and applying deterministic transformations to the sampled values:

$$(\epsilon_x, \epsilon_z) \sim p_{\epsilon} = \mathcal{N}(0, I) \quad (16)$$

$$z = T_{\theta}^z(\epsilon_z),\ x = T_{\theta}^x(z(\epsilon_z), \epsilon_x) = T_{\theta}^x(T_{\theta}^z(\epsilon_z), \epsilon_x) \quad (17)$$

In Equation 15, $\epsilon_x$ and $\epsilon_z$ are noise values that are sampled from a standard Normal distribution. The sampled $\epsilon_z$ values are injected into prior 252 to produce prior 252 samples z (e.g., a concatenation of latent variable values sampled from latent variable hierarchy 204), and the $\epsilon_x$ samples are injected into decoder 206 to produce data samples x, given prior 252 samples. In Equation 16, $T_{\Theta}^z$ denotes the transformation of noise $\epsilon_z$ into prior samples z by prior 252, and $T_{\Theta}^x$ represents the transformation of noise $\epsilon_x$ into samples x, given prior samples z, by decoder 206.

More specifically, training engine 122 applies the above transformations during sampling from EBM 212 by sampling $(\epsilon_x, \epsilon_z)$ from the following "base" distribution:

$$h_{\psi,\theta}(\epsilon_x, \epsilon_z) \propto e^{-E_{\psi}(T_{\theta}^x(T_{\theta}^z(\epsilon_z), \epsilon_x))} p_{\epsilon}(\epsilon_x, \epsilon_z), \quad (18)$$

and then using Equation 17 to transform the samples into x and z. Because $\epsilon_x$ and $\epsilon_z$ are sampled from the same standard Normal distribution, $\epsilon_x$ and $\epsilon_z$ have the same scale, and the MCMC sampling scheme (e.g., step size in LD) does not need to be tuned for each variable.

Training engine 122 optionally updates parameters of VAE 200 during the second stage of EBM training 222. In particular, training engine 122 may avoid expensive updates for $\psi$ by bringing $p_{\Theta}(x)$ closer to $h_{\psi,\Theta}(x)$ by minimizing $D_{KL}(p_{\Theta}(x) \| h_{\psi,\Theta}(x))$ with respect to $\Theta$. This can be performed by assuming the target distribution $h_{\psi,\Theta}(x)$ is fixed, creating a copy of $\Theta$ named $\Theta'$, and updating $\Theta'$ by the gradient:

$$\nabla_{\Theta'} D_{KL}(p_{\Theta}(x) \| h_{\psi,\theta}(x)) = \nabla_{\Theta'} \mathbb{E}_{x \sim p_{\Theta}(x)}[E_{\psi}(x)] \quad (19)$$

One update step for that $\Theta'$ minimizes $D_{KL}(p'_{\Theta}(x) \| h_{\psi,\Theta}(x))$ with respect to $\Theta'$ can be performed by drawing samples from $p'_{\Theta}(x)$ and minimizing the energy function with respect to $\Theta'$. The KL objective above encourages to $p_{\Theta}(x)$ model dominant modes in $h_{\psi,\Theta}(x)$.

After training engine 122 completes VAE training 220 and EBM training 222 (either as separate stages or jointly), training engine 122 and/or another component of the system create joint model 226 from VAE 200 and EBM 212. Execution engine 124 then uses joint model 226 to produce generative output 250 that is not found in the set of training data 208.

More specifically, execution engine 124 uses one or more components of VAE 200 to generate one or more VAE samples 236 and inputs VAE samples 236 into EBM 212 to produce one or more energy values 218. Next, execution engine 124 adjusts VAE samples 236 using energy values

218 to produce one or more joint model samples 224 from joint model 226. Finally, execution engine 124 uses joint model samples 224 to produce generative output 250.

For example, VAE samples 236 could include samples of data point values from the data likelihood generated by decoder 206, after one or more groups of latent variable values sampled from latent variable hierarchy 204 in prior 252 are inputted into decoder 206. Execution engine 124 could input these VAE samples 236 into EBM 212 to generate one or more energy values 218 that indicate how well VAE samples 236 reflect the distribution of training data 208 used to train joint model 226. Execution engine 124 could then use an MCMC technique such as LD with Equation 6 to iteratively update VAE samples 236 based on the corresponding energy values 218, so that over time energy values 218 are minimized and the probability of VAE samples 236 in the distribution of training data 208 increases. After a certain number of MCMC iterations is performed, execution engine 124 could use the resulting VAE samples 236 as generative output 250.

In another example, VAE samples 236 could include one or more samples $\epsilon=(\epsilon_x, \epsilon_z)$ from one or more noise distributions, which are used to produce latent variable samples z and data samples x, given the prior samples. Execution engine 124 could apply EBM 212 to VAE samples 236 to generate one or more energy values 218 that indicate how well the corresponding latent variable samples and/or data point samples reflect the respective distributions of latent variables generated by encoder 202 from training data and/or distribution of data point values in training data 208. Execution engine 124 could then use an MCMC technique such as LD to iteratively update VAE samples 236 based on the corresponding energy values 218 and the following equation:

$$\epsilon_{t+1} = \epsilon_t - \frac{\eta}{2}\nabla_{\epsilon_t} E_{\psi,\theta}(\epsilon_t) + \sqrt{\eta}\,\omega_t, \, \omega_t \sim \mathcal{N}(0, I) \quad (20)$$

where the energy function is obtained from Equation 18. After a certain number of MCMC iterations, execution engine 124 could input the latest values of c into prior 252 and decoder 206. Finally, execution engine 124 could produce generative output 250 by sampling from the data likelihood generated by decoder 206. Because the data likelihood is produced using updated $\epsilon$ values that have been adjusted based on energy values 218, decoder 206 avoids assigning high probabilities to data values that have low probability in training data 208. In turn, generative output 250 better resembles training data 208 than generative output 250 that is produced without adjusting the initial VAE samples 236.

Figure 3B:
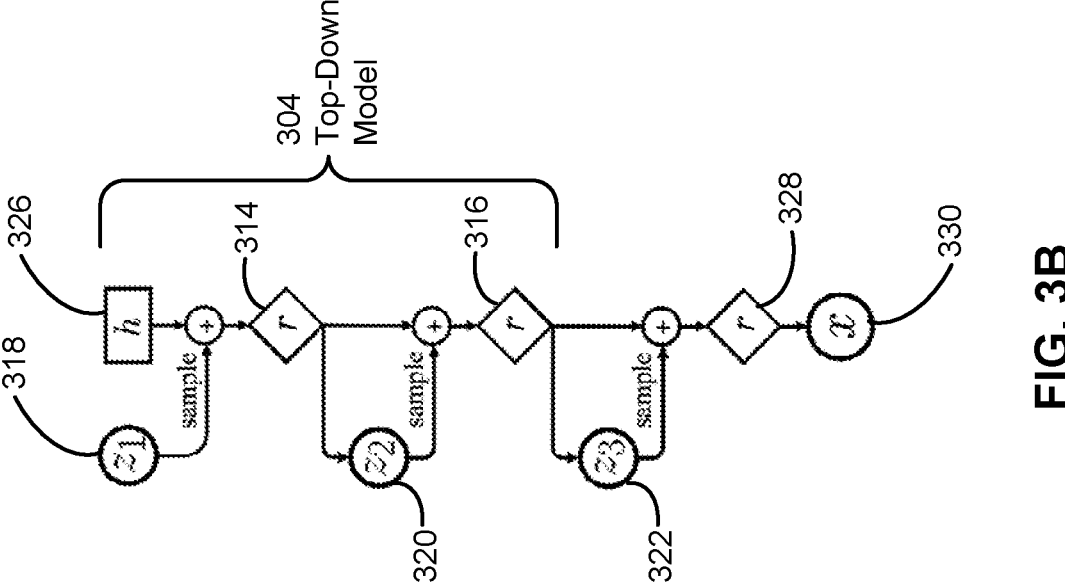
FIG. 3B illustrates an exemplar architecture for a generative model included in the hierarchical version of the VAE of FIG. 2, according to various embodiments.
Figure 3A:
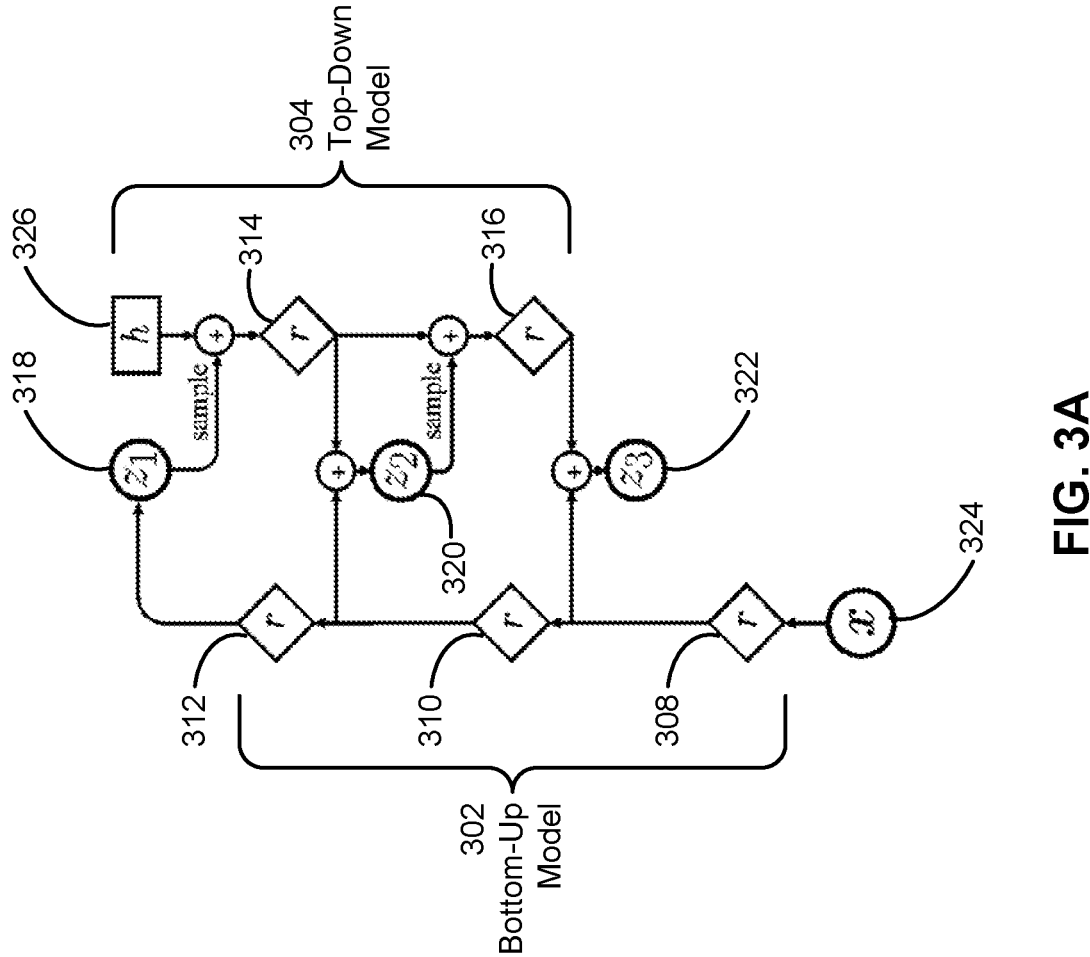
FIG. 3A illustrates an exemplar architecture for the encoder included in the hierarchical version of the VAE of FIG. 2, according to various embodiments.

FIG. 3A illustrates an exemplar architecture for encoder 202 in the hierarchical version of VAE 200 of FIG. 2, according to various embodiments. As shown, the example architecture forms a bidirectional inference model that includes a bottom-up model 302 and a top-down model 304.

Bottom-up model 302 includes a number of residual networks 308-312, and top-down model 304 includes a number of additional residual networks 314-316 and a trainable parameter 326. Each of residual networks 308-316 includes one or more residual cells, which are described in further detail below with respect to FIGS. 4A and 4B.

Residual networks 308-312 in bottom-up model 302 deterministically extract features from an input 324 (e.g., an image) to infer the latent variables in the approximate posterior (e.g., q(z|x) in the probability model for VAE 200).

In turn, components of top-down model 304 are used to generate the parameters of each conditional distribution in latent variable hierarchy 204. After latent variables are sampled from a given group in latent variable hierarchy 204, the samples are combined with feature maps from bottom-up model 302 and passed as input to the next group.

More specifically, a given data input 324 is sequentially processed by residual networks 308, 310, and 312 in bottom-up model 302. Residual network 308 generates a first feature map from input 324, residual network 310 generates a second feature map from the first feature map, and residual network 312 generates a third feature map from the second feature map. The third feature map is used to generate the parameters of a first group 318 of latent variables in latent variable hierarchy 204, and a sample is taken from group 318 and combined (e.g., summed) with parameter 326 to produce input to residual network 314 in top-down model 304. The output of residual network 314 in top-down model 304 is combined with the feature map produced by residual network 310 in bottom-up model 302 and used to generate the parameters of a second group 320 of latent variables in latent variable hierarchy 204. A sample is taken from group 320 and combined with output of residual network 314 to generate input into residual network 316. Finally, the output of residual network 316 in top-down model 304 is combined with the output of residual network 308 in bottom-up model 302 to generate parameters of a third group 322 of latent variables, and a sample may be taken from group 322 to produce a full set of latent variables representing input 324.

While the example architecture of FIG. 3A is illustrated with a latent variable hierarchy of three latent variable groups 318-322, those skilled in the art will appreciate that encoder 202 may utilize a different number of latent variable groups in the hierarchy, different numbers of latent variables in each group of the hierarchy, and/or varying numbers of residual cells in residual networks. For example, latent variable hierarchy 204 for an encoder that is trained using 28×28 pixel images of handwritten characters may include 15 groups of latent variables at two different "scales" (i.e., spatial dimensions) and one residual cell per group of latent variables. The first five groups have 4×4×20-dimensional latent variables (in the form of height×width×channel), and the next ten groups have 8×8×20-dimensional latent variables. In another example, latent variable hierarchy 204 for an encoder that is trained using 256×256 pixel images of human faces may include 36 groups of latent variables at five different scales and two residual cells per group of latent variables. The scales include spatial dimensions of 8×8×20, 16×16×20, 32×32×20, 64×64×20, and 128×128×20 and 4, 4, 4, 8, and 16 groups, respectively.

FIG. 3B illustrates an exemplar architecture for a generative model in the hierarchical version of VAE 200 of FIG. 2, according to various embodiments. As shown, the generative model includes top-down model 304 from the exemplar encoder architecture of FIG. 3A, as well as an additional residual network 328 that implements decoder 206.

In the exemplar generative model architecture of FIG. 3B, the representation extracted by residual networks 314-316 of top-down model 304 is used to infer groups 318-322 of latent variables in the hierarchy. A sample from the last group 322 of latent variables is then combined with the output of residual network 316 and provided as input to residual network 328. In turn, residual network 328 generates a data output 330 that is a reconstruction of a corresponding input 324 into the encoder and/or a new data point sampled from the distribution of training data for VAE 200.

In some embodiments, top-down model 304 is used to learn a prior (e.g., prior 252 of FIG. 2) distribution of latent variables during training of VAE 200. The prior is then reused in the generative model and/or joint model 226 to sample from groups 318-322 of latent variables before some or all of the samples are converted by decoder 206 into generative output. This sharing of top-down model 304 between encoder 202 and the generative model reduces computational and/or resource overhead associated with learning a separate top-down model for prior 252 and using the separate top-down model in the generative model. Alternatively, VAE 200 may be structured so that encoder 202 uses a first top-down model to generate latent representations of training data 208 and the generative model uses a second, separate top-down model as prior 252.

Figure 4A:
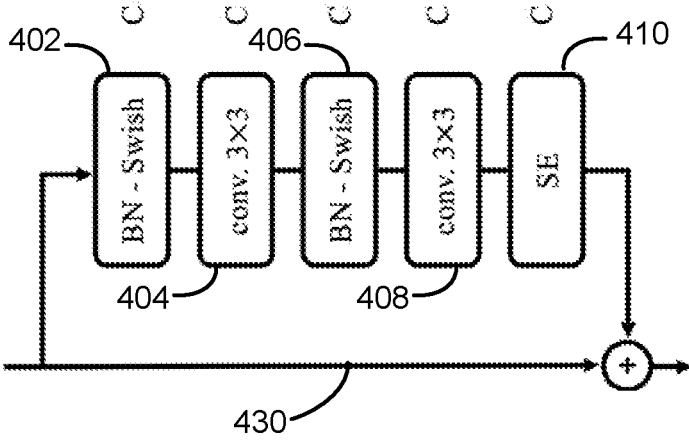
FIG. 4A illustrates an exemplar residual cell that is included in the encoder included in the hierarchical version of the VAE of FIG. 2, according to various embodiments.

FIG. 4A illustrates an exemplar residual cell in encoder 202 of the hierarchical version of VAE 200 of FIG. 2, according to various embodiments. More specifically, FIG. 4A shows a residual cell that is used by one or more residual networks 308-312 in bottom-up model 302 of FIG. 3A. As shown, the residual cell includes a number of blocks 402-410 and a residual link 430 that adds the input into the residual cell to the output of the residual cell.

Block 402 is a batch normalization block with a Swish activation function, block 404 is a 3×3 convolutional block, block 406 is a batch normalization block with a Swish activation function, block 408 is a 3×3 convolutional block, and block 410 is a squeeze and excitation block that performs channel-wise gating in the residual cell (e.g., a squeeze operation such as mean to obtain a single value for each channel, followed by an excitation operation that applies a non-linear transformation to the output of the squeeze operation to produce per-channel weights). In addition, the same number of channels is maintained across blocks 402-410. Unlike conventional residual cells with a convolution-batch normalization-activation ordering, the residual cell of FIG. 4A includes a batch normalization-activation-convolution ordering, which may improve the performance of bottom-up model 302 and/or encoder 202.

Figure 4B:
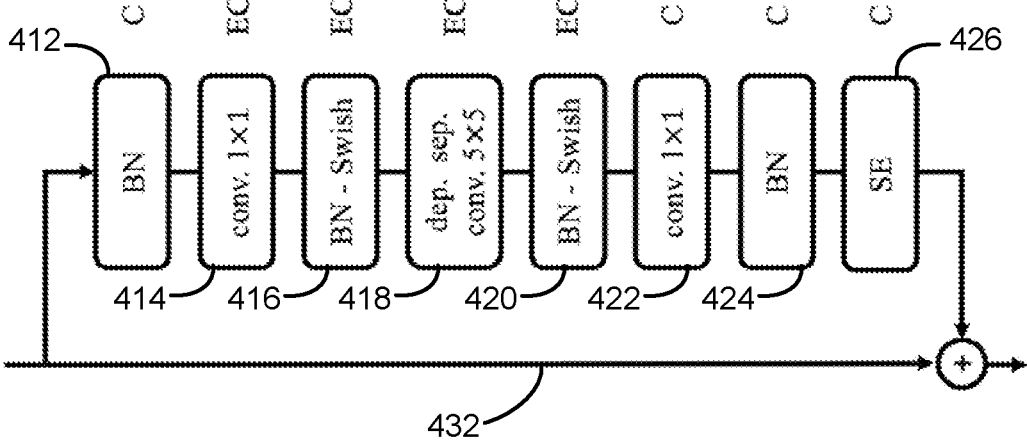
FIG. 4B illustrates an exemplar residual cell in a generative portion of the hierarchical version of the VAE of FIG. 2, according to various embodiments.

FIG. 4B illustrates an exemplar residual cell in a generative portion of the hierarchical version of VAE 200 of FIG. 2, according to various embodiments. More specifically, FIG. 4B shows a residual cell that is used by one or more residual networks 314-316 in top-down model 304 of FIGS. 3A and 3B. As shown, the residual cell includes a number of blocks 412-426 and a residual link 432 that adds the input into the residual cell to the output of the residual cell.

Block 412 is a batch normalization block, block 414 is a 1×1 convolutional block, block 416 is a batch normalization block with a Swish activation function, block 418 is a 5×5 depthwise separable convolutional block, block 420 is a batch normalization block with a Swish activation function, block 422 is a 1×1 convolutional block, block 424 is a batch normalization block, and block 426 is a squeeze and excitation block. Blocks 414-420 marked with "EC" indicate that the number of channels is expanded "E" times, while blocks marked with "C" include the original "C" number of channels. In particular, block 414 performs a 1×1 convolution that expands the number of channels to improve the expressivity of the depthwise separable convolutions performed by block 418, and block 422 performs a 1×1 convolution that maps back to "C" channels. At the same time, the depthwise separable convolution reduces parameter size and computational complexity over regular convolutions with increased kernel sizes without negatively impacting the performance of the generative model.

Moreover, the use of batch normalization with a Swish activation function in the residual cells of FIGS. 4A and 4B may improve the training of encoder 202 and/or the generative model over conventional residual cells or networks. For example, the combination of batch normalization and the Swish activation in the residual cell of FIG. 4A improves the performance of a VAE with 40 latent variable groups by about 5% over the use of weight normalization and an exponential linear unit activation in the same residual cell.

FIG. 5A illustrates an exemplar architecture 502 for EBM 212 of FIG. 2, according to various embodiments. More specifically, FIG. 5A shows architecture 502 for EBM 212 that can be used to adjust the generation of 64×64 images by VAE 200. As shown in FIG. 5A, architecture 502 includes a sequence of 11 components, with the output of one component in the sequence provided as input into the next component in the sequence. The first three components include a 3×3 two-dimensional (2D) convolution with 64 filters, a "ResBlock down 64" component, and a "ResBlock 64" component. The next three components include a "ResBlock down 128" component, a "ResBlock 128" component, and a "ResBlock down 128" component. The following three components include a "ResBlock 256" component, a "ResBlock down 256" component, and a "ResBlock 256" component. Finally, the last two components in architecture 502 include a global sum pooling layer and a fully connected layer.

FIG. 5B illustrates an exemplar architecture for the EBM 212 of FIG. 2, according to other various embodiments. More specifically, FIG. 5B shows another architecture 504 for EBM 212 that can be used to adjust the generation of 64×64 images by VAE 200. As shown in FIG. 5B, architecture 504 includes a sequence of 13 components, with the output of one component in the sequence provided as input into the next component in the sequence. As with architecture 502 of FIG. 5A, the first three components in architecture 504 include a 3×3 two-dimensional (2D) convolution with 64 filters, a "ResBlock down 64" component, and a "ResBlock 64" component. The next four components include a "ResBlock down 128" component, two "ResBlock 128" components, and a "ResBlock down 128" component. The following four components include two "ResBlock 256" components, one "ResBlock down 256" component, and one "ResBlock 256" component. Finally, the last two components in architecture 504 include a global sum pooling layer and a fully connected layer.

FIG. 5C illustrates an exemplar architecture 506 for EBM 212 of FIG. 2, according to yet other various embodiments. More specifically, FIG. 5C shows architecture 504 for EBM 212 that can be used to adjust the generation of 128×128 images by VAE 200. As shown in FIG. 5C, architecture 504 includes a sequence of 15 components, with the output of one component in the sequence provided as input into the next component in the sequence. As with architectures 502 and 504 of FIGS. 5A and 5B, the first three components include a 3×3 two-dimensional (2D) convolution with 64 filters, a "ResBlock down 64" component, and a "ResBlock 64" component. The next four components include a "ResBlock down 128" component and a "ResBlock 128" component, followed by another "ResBlock down 128" component and a "ResBlock 128" component. The following four components include a "ResBlock down 256" component and a "ResBlock 256" component, followed by another "ResBlock down 256" component and a "ResBlock 256" component. The last four components in architecture 504 include a "ResBlock down 512" component, a "ResBlock 512" component, a global sum pooling layer, and a fully connected layer.

In architectures 502-506 of FIGS. 5A-5C, a "ResBlock down" component includes a convolutional layer with a stride of 2 and a 3×3 convolutional kernel that performs downsampling, followed by a residual block. A "ResBlock" component includes a residual block. A numeric value following "ResBlock down" or "ResBlock" in architecture 502 refers to the number of filters used in the corresponding component.

As shown in FIGS. 5A-5C, the depth of the network for EBM 212 increases with image size. In some embodiments, each ResBlock component includes a Swish activation function and weight normalization with data-dependent initialization. The energy function in EBM 212 can additionally be trained by minimizing the negative log likelihood and an additional spectral regularization loss that penalizes the spectral norm of each convolutional layer in EBM 212.

Although EBM 212 and joint model 226 have been described above with respect to VAE 200, it will be appreciated that EBM 212 and joint model 226 can also be used to improve the generative output of other types of generative models that include a prior distribution of latent variables in a latent space, a decoder that converts samples of the latent variables into samples in a data space of a training dataset, and a component or method that maps a sample in the training dataset to a sample in the latent space of the latent variables. In the context of VAE 200, the prior distribution is learned by prior 252, encoder 202 converts samples of training data in the data space into latent variables in the latent space associated with latent variable hierarchy 204, and decoder 206 is a neural network that is separate from encoder 202 and converts latent variable values from the latent space back into likelihoods in the data space.

A generative adversarial network (GAN) is another type of generative model that can be used with EBM 212 and joint model 226. The prior distribution in the GAN is represented by a Gaussian and/or another type of simple distribution, the decoder in the GAN is a generator network that converts a sample from the prior distribution into a sample in the data space of a training dataset, and the generator network can be numerically inverted to map samples in the training dataset to samples in the latent space of the latent variables.

A normalizing flow is another type of generative model that can be used with EBM 212 and joint model 226. As with the GAN, the prior distribution in a normalizing flow is implemented using a Gaussian and/or another type of simple distribution. The decoder in a normalizing flow is represented by a decoder network that relates the latent space to the data space using a deterministic and invertible transformation from observed variables in the data space to latent variables in the latent space. The inverse of the decoder network in the normalizing flow can be used to map a sample in the training dataset to a sample in the latent space.

With each of these types of generative models, a first training stage is used to train the generative model, and a second training stage is used to train EBM 212 to learn an energy function that distinguishes between values sampled from one or more distributions associated with training data 208 and values sampled from one or more distributions used during operation of one or more portions of the trained generative model. Joint model 226 is then created by combining the portion(s) of the trained generative model with EBM 212.

Figure 6:
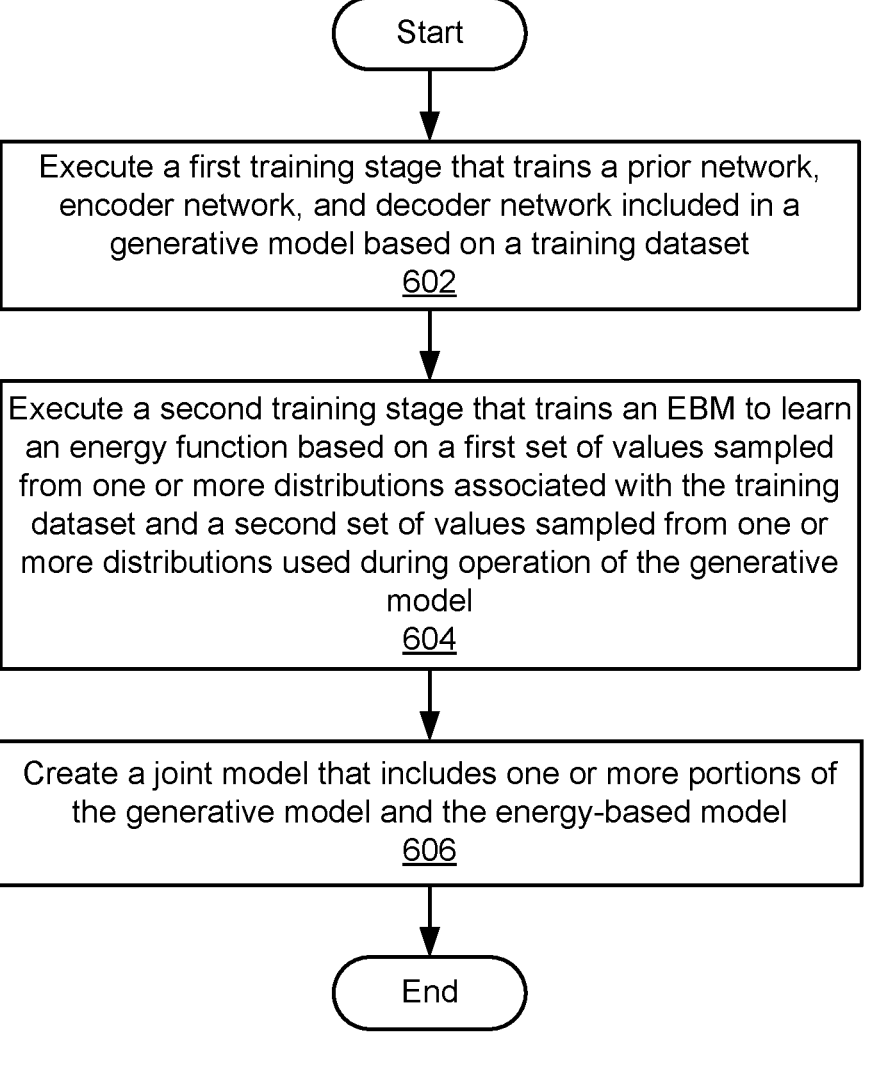
FIG. 6 illustrates a flow diagram of method steps for training a generative model, according to various embodiments.

FIG. 6 illustrates a flow diagram of method steps for training a generative model, according to various embodiments. Although the method steps are described in conjunction with the systems of FIGS. 1-5, persons skilled in the art will understand that any system configured to perform the method steps in any order falls within the scope of the present disclosure.

As shown, training engine 122 executes 602 a first training stage that trains a prior network, encoder network, and decoder network included in a generative model based on a training dataset. For example, training engine 122 could input a set of training images that have been scaled to a certain resolution into a hierarchical VAE (or another type of generative model that includes a distribution of latent variables). The training images may include human faces, animals, vehicles, and/or other types of objects. Training engine 122 could also perform one or more operations that update parameters of the hierarchical VAE based on the output of the prior, encoder, and decoder networks and a corresponding objective function.

Next, training engine 122 executes 604 a second training stage that trains an EBM to learn an energy function based on a first set of values sampled from one or more distributions associated with the training dataset and a second set of values sampled from one or more distributions used during operation of the generative model. For example, the first set of values could include data points that are sampled from the training dataset, and the second set of values could include data points that are sampled from output distributions generated by the decoder network after latent variable values sampled from the prior network are inputted into the decoder network. The EBM thus learns an energy function that generates a low energy value from a data point that is sampled from the training dataset and a high energy value from a data point that is not sampled from the training dataset. In another example, the first set of values could be sampled from one or more noise distributions during operation of a VAE that is trained in operation 602. The first set of values could then be injected into the prior and/or decoder networks in the VAE to produce latent variable values and/or pixel values in an output image, respectively. Thus, the EBM learns an energy function that generates, from the sampled noise values, one or more energy values indicating how well the corresponding latent variable values and/or pixel values reflect the distributions of latent variables and/or distributions of pixel values in the training dataset used to train the VAE and energy-based model.

Training engine 122 then creates 606 a joint model that includes one or more portions of the generative model and the EBM. For example, the joint model could include the prior and decoder networks in a VAE and the EBM. The joint model can then be used to generate new data points that are not found in the training dataset but that incorporate attributes extracted from the training dataset, as described in further detail below with respect to FIG. 7.

Figure 7:
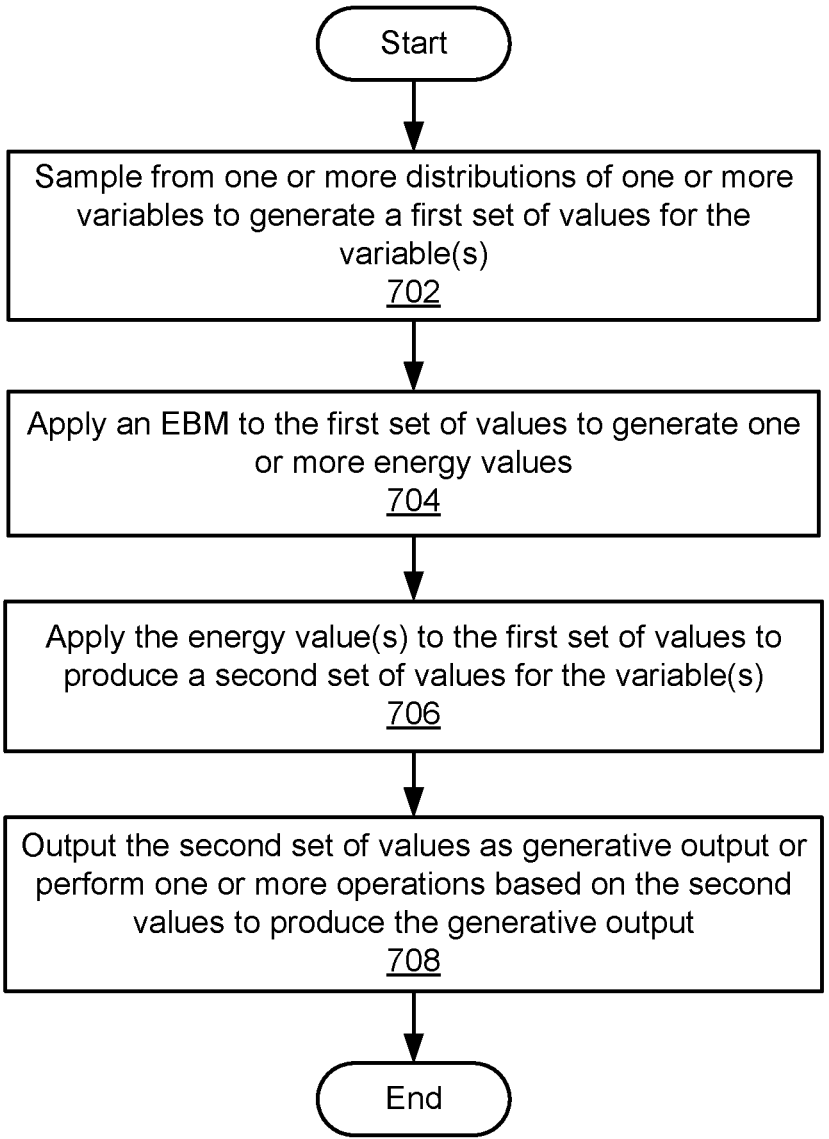
FIG. 7 illustrates a flow diagram of method steps for producing generative output, according to various embodiments.

FIG. 7 illustrates a flow diagram of method steps for producing generative output, according to various embodiments. Although the method steps are described in conjunction with the systems of FIGS. 1-5, persons skilled in the art will understand that any system configured to perform the method steps in any order falls within the scope of the present disclosure.

As shown, execution engine 124 samples 702 from one or more distributions of one or more variables to generate a first set of values for the variable(s). For example, the distribution(s) could include one or more likelihood distributions outputted by the decoder network in a VAE and/or another type of generative model, and the first set of values could include generative output that is produced by sampling from the likelihood distribution(s). In another example, the distribution(s) could include one or more noise distributions used during operation of the prior and/or decoder networks in the VAE and/or generative model, and the first set of values could include one or more noise values inputted into the prior network to produce a set of latent variable values and/or one or more noise values inputted into the decoder network to produce the likelihood distribution(s).

Next, execution engine 124 applies 704 an EBM to the first set of values to generate one or more energy values. For example, execution engine 124 could input the first set of values into the EBM, and the EBM could use an energy function to generate the energy value(s).

Execution engine 124 then applies 706 the energy value(s) to the first set of values to produce a second set of values for the variable(s). For example, execution engine 124 could use LD and/or another type of MCMC sampling technique to iteratively update the first set of values based on the gradient of the energy function learned by the EBM. During operation 706, execution engine 124 uses the energy value(s) from the energy function to reduce the likelihood associated with one or more regions in the distribution(s) from which the first set of values was sampled, when the region(s) have low density in one or more corresponding distributions of variables generated from the training dataset. After a certain number of iterations, execution engine 124 obtains the second set of values as an adjustment to the first set of values.

Finally, in operation 708, execution engine 124 outputs the second set of values as generative output, or performs one or more operations based on the second set of values to produce the generative output. For example, execution engine 124 could output the second set of values as pixel values in an image that is generated by a joint model that includes a VAE and the EBM. In another example, execution engine 124 could input a first noise value included in the second set of values into a prior network included in the generative model to produce a set of latent variable values. Next, execution engine 124 could input the set of latent variable values and a second noise value included in the second set of values into a decoder network included in the generative model to produce an output (e.g., likelihood) distribution. Execution engine 124 could then sample from the output distribution to generate the set of output data.

Example Game Streaming System

Figure 8:
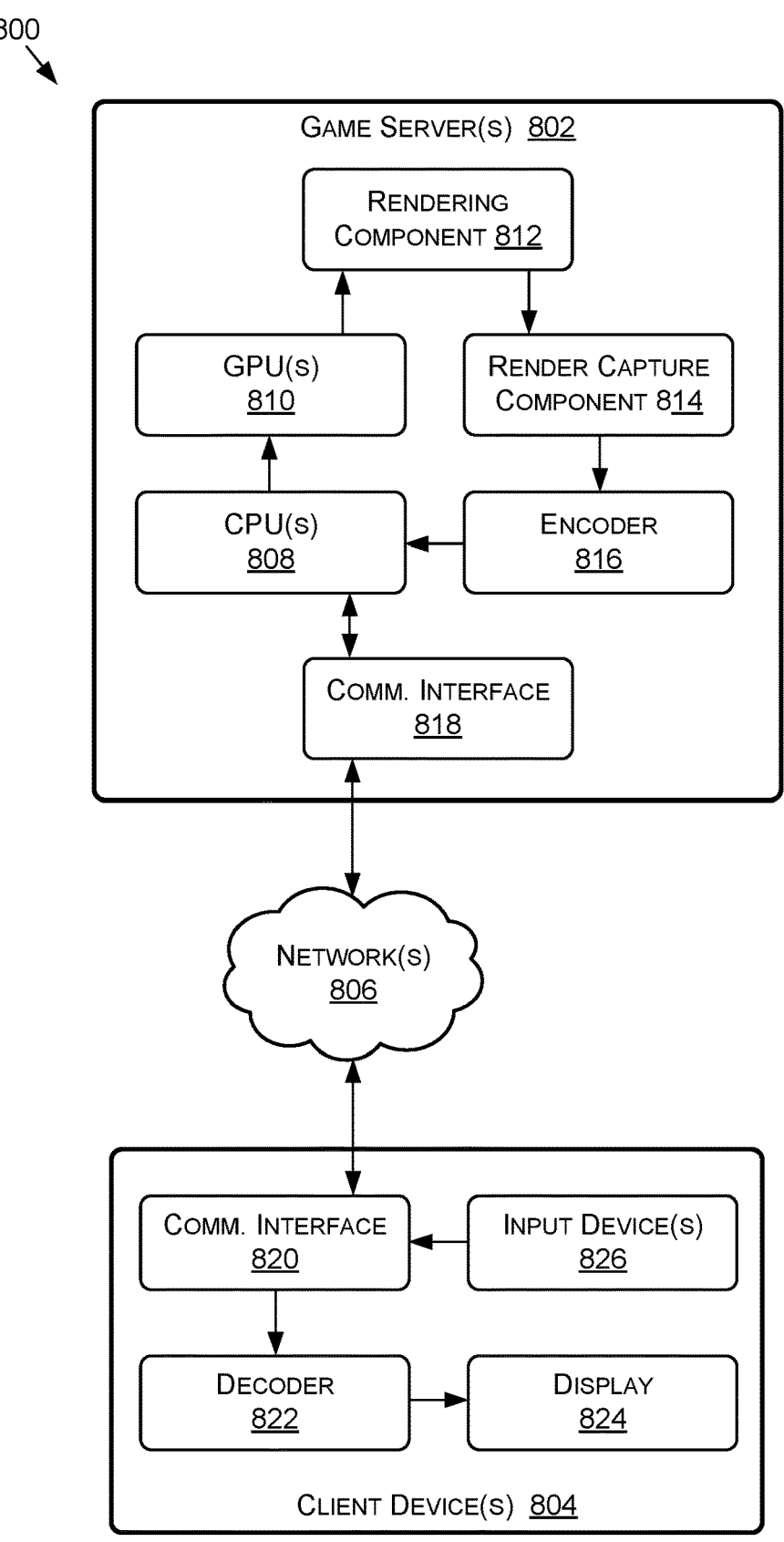
FIG. 8 illustrates a game streaming system configured to implement one or more aspects of the various embodiments.

FIG. 8 illustrates an example system diagram for a game streaming system 800, according to various embodiments. FIG. 8 includes game server(s) 802 (which may include similar components, features, and/or functionality to the example computing device 100 of FIG. 1), client device(s) 804 (which may include similar components, features, and/or functionality to the example computing device 100 of FIG. 1), and network(s) 806 (which may be similar to the network(s) described herein). In some embodiments, system 800 may be implemented using a cloud computing system and/or distributed system.

In system 800, for a game session, client device(s) 804 may only receive input data in response to inputs to the input device(s), transmit the input data to game server(s) 802, receive encoded display data from game server(s) 802, and display the display data on display 824. As such, the more computationally intense computing and processing is off-loaded to game server(s) 802 (e.g., rendering—in particular ray or path tracing—for graphical output of the game session is executed by the GPU(s) of game server(s) 802). In other words, the game session is streamed to client device(s) 804 from game server(s) 802, thereby reducing the requirements of client device(s) 804 for graphics processing and rendering.

For example, with respect to an instantiation of a game session, a client device 804 may be displaying a frame of the game session on the display 824 based on receiving the display data from game server(s) 802. Client device 804 may receive an input to one or more input device(s) 826 and generate input data in response. Client device 804 may transmit the input data to the game server(s) 802 via communication interface 820 and over network(s) 806 (e.g., the Internet), and game server(s) 802 may receive the input data via communication interface 818. CPU(s) 808 may receive the input data, process the input data, and transmit data to GPU(s) 810 that causes GPU(s) 810 to generate a rendering of the game session. For example, the input data may be representative of a movement of a character of the user in a game, firing a weapon, reloading, passing a ball, turning a vehicle, etc. Rendering component 812 may render the game session (e.g., representative of the result of the input data), and render capture component 814 may capture the rendering of the game session as display data (e.g., as image data capturing the rendered frame of the game session). The rendering of the game session may include ray- or path-traced lighting and/or shadow effects, computed using one or more parallel processing units—such as GPUs 810, which may further employ the use of one or more dedicated hardware accelerators or processing cores to perform ray or path-tracing techniques—of game server(s) 802. Encoder 816 may then encode the display data to generate encoded display data and the encoded display data may be transmitted to client device 804 over network(s) 806 via communication interface 818. Client device 804 may receive the encoded display data via communication interface 820, and decoder 822 may decode the encoded display data to generate the display data. Client device 804 may then display the display data via display 824.

In some embodiments, system 800 includes functionality to implement training engine 122 and/or execution engine 124 of FIGS. 1-2. For example, one or more components of game server 802 and/or client device(s) 804 could execute training engine 122 to train a VAE and/or another generative model that includes a prior distribution of latent variables in a latent space, a decoder that converts samples of the latent variables into samples in a data space of a training dataset, and a component or method that maps a sample in the training dataset to a sample in the latent space of the latent variables. The training dataset could include audio, video, text, images, models, or other representations of characters, objects, or other content in a game. The executed training engine 122 may then train an EBM to learn an energy function that differentiates between a first set of values sampled from one or more first distributions associated with the training dataset and a second set of values sampled from one or more second distributions used during operation of one or more portions of the trained generative model. One or more components of game server 802 and/or client device(s) 804 may then execute execution engine 124 to produce generative output (e.g., additional images or models of characters or objects that are not found in the training dataset) by sampling a first set of values from distributions of one or more variables that are used during operation of one or more portions of the variational autoencoder, applying one or more energy values generated via the EBM to the first set of values to produce a second set of values for the one or more variables (e.g., by iteratively updating the first set of values based on a gradient of an energy function learned by the EBM), and either outputting the set of second values as output data or performing one or more operations based on the second set of values to generate output data.

In sum, the disclosed techniques improve generative output produced by VAEs and/or other types of generative models with distributions of latent variables. After a generative model is trained on a training dataset, an EBM is trained to learn an energy function that distinguishes between values sampled from one or more distributions associated with the training dataset and values sampled from one or more distributions used during operation of one or more portions of the generative model. One or more portions of the generative model are combined with the EBM to produce a joint model that produces generative output.

During operation of the joint model, a first set of values is sampled from distributions of one or more variables used to operate one or more portions of the generative model. These distributions can include one or more likelihood distributions outputted by a decoder network in the generative model and/or one or more noise distributions that are used by the portion(s) of the generative model to sample from a prior distribution of latent variables and/or from the likelihood distribution(s). The first set of values is inputted into the EBM, and one or more energy values generated by the EBM from the first set of values are applied to the first set of values to generate a second set of values for the same variable(s). The energy value(s) from the EBM shift the first set of values away from one or more regions in the distribution(s) that have a low density in one or more corresponding distributions of data values generated from the training dataset. When the first set of values is sampled from the likelihood distribution(s), the second set of values is used as generative output for the joint model. When the first set of values is sampled from one or more noise distributions used to operate the portion(s) generative model, the second set of values is inputted into the portion(s) to convert the second set of values into generative output for the joint model.

At least one technical advantage of the disclosed techniques relative to the prior art is that the disclosed techniques produce generative output that looks more realistic and similar to the data in a training dataset compared to what is typically produced using conventional variational autoencoders (or other types of generative models that learn distributions of latent variables). Another technical advantage is that, with the disclosed techniques, a complex distribution of values representing a training dataset can be approximated by a joint model that is trained and in a more computationally efficient manner relative to prior art techniques. These technical advantages provide one or more technological improvements over prior art approaches.

1. In some embodiments, a computer-implemented method for creating a generative model comprises performing one or more operations based on a plurality of training images to generate a trained variational autoencoder, wherein the trained variational autoencoder includes an encoder network that converts the plurality of training images into a set of latent variable values, a prior network that learns a distribution of the set of latent variable values across the plurality of training images, and a decoder network that converts one or more latent variable values into one or more output distributions of pixel values in a plurality of output images, performing one or more operations to train an energy-based model to learn an energy function based on a first set of values sampled from one or more first distributions associated with the plurality of training images and a second set of values sampled from one or more second distributions used during operation of one or more portions of the trained variational autoencoder, and creating a joint model that includes the one or more portions of the trained variational autoencoder and the energy-based model, wherein the joint model applies one or more energy values generated via the energy-based model to a third set of values sampled from the one or more second distributions to produce a fourth set of values, wherein, in operation, the joint model produces the fourth set of values in order to generate a new image that is not included in the plurality of training images.

2. The computer-implemented method of clause 1, wherein the one or more portions of the trained variational autoencoder include the prior network and the decoder network.

3. The computer-implemented method of clauses 1 or 2, wherein the new image comprises at least one face.

4. In some embodiments, a computer-implemented method for creating a generative model comprises performing one or more operations based on a training dataset to generate a trained generative model, wherein the trained generative model includes a first component that converts a plurality of data points included in the training dataset into a set of latent variable values, a second component that learns a distribution of the set of latent variable values across the training dataset, and a third component that converts one or more latent variable values into one or more output distributions, performing one or more operations to train an energy-based model to learn an energy function based on a first set of values sampled from one or more first distributions associated with the training dataset and a second set of values sampled from one or more second distributions used during operation of one or more portions of the trained generative model, and creating a joint model that includes the one or more portions of the trained generative model and the energy-based model, wherein the joint model applies one or more energy values generated via the energy-based model to a third set of values sampled from the one or more second distributions to produce a fourth set of values, wherein, in operation, the joint model produces the fourth set of values in order to generate a new data point that is not included in the training dataset.

5. The computer-implemented method of clause 4, wherein performing the one or more operations to train the energy-based model comprises performing a positive phase that updates the energy function based on a derivative of a log-likelihood of the training dataset and the first set of values.

6. The computer-implemented method of clauses 4 or 5, wherein performing the one or more operations to train the energy-based model further comprises performing a negative phase that updates the energy function based on the derivative of the log-likelihood of the training dataset and the second set of values.

7. The computer-implemented method of any of clauses 4-6, wherein performing the one or more operations to train the energy-based model comprises iteratively updating parameters of the energy-based model based on a gradient of the energy function with respect to one or more noise values used during operation of the one or more portions of the trained generative model.

8. The computer-implemented method of any of clauses 4-7, wherein the one or more noise values include a first noise value used in operation of the second component to generate one or more latent variable values and a second noise value used in operation of the third component to generate the one or more output distributions.

9. The computer-implemented method of any of clauses 4-8, wherein performing the one or more operations to train the energy-based model comprises applying a spectral regularization loss to a spectral norm of a convolutional layer in the energy-based model.

10. The computer-implemented method of any of clauses 4-9, wherein the distribution of the set of latent variables learned by the second component comprises a hierarchy of latent variables, and wherein the performing the one or more operations to generate the trained generative model comprises sampling one first value from a first group of latent variables included in the hierarchy of latent variables, and sampling another first value from a second group of latent variables included in the hierarchy of latent variables based on the first value and a feature map.

11. The computer-implemented method of any of clauses 4-10, wherein the energy-based model comprises a first residual block and a second residual block with downsampling.

12. The computer-implemented method of any of clauses 4-11, wherein the first residual block and the second residual block comprise a Swish activation function.

13. The computer-implemented method of any of clauses 4-12, wherein the energy-based model comprises a convolutional layer, a global sum pooling layer, and a fully connected layer.

14. In some embodiments, one or more non-transitory computer readable media store instructions that, when executed by one or more processors, cause the one or more processors to perform the steps of performing one or more operations based on a training dataset to generate a trained generative model, wherein the trained generative model includes a first component that converts a plurality of data points included in the training dataset into a set of latent variable values, a second component that learns a distribution of the set of latent variable values across the training dataset, and a third component that converts one or more latent variable values into one or more output distributions, performing one or more operations to train an energy-based model to learn an energy function based on a first set of values sampled from one or more first distributions associated with the training dataset and a second set of values sampled from one or more second distributions used during operation of one or more portions of the trained generative model, and creating a joint model that includes the one or more portions of the trained generative model and the energy-based model, wherein the joint model applies one or more energy values generated via the energy-based model to a third set of values sampled from the one or more second distributions to produce a fourth set of values, wherein, in operation, the joint model produces the fourth set of values in order to generate a new data point that is not included in the training dataset.

15. The one or more non-transitory computer readable media of clause 14, wherein performing the one or more operations to train the energy-based model comprises performing a positive phase that updates the energy function based on a derivative of a log-likelihood of the training dataset and the first set of values, and performing a negative phase that updates the energy function based on the derivative of the log-likelihood of the training dataset and the second set of values.

16. The one or more non-transitory computer readable media of clauses 14 or 15, wherein performing the one or more operations to train the energy-based model comprises iteratively updating parameters of the energy-based model based on a gradient of the energy function with respect to one or more values used during operation of the one or more portions of the trained generative model.

17. The one or more non-transitory computer readable media of any of clauses 14-16, wherein the one or more values comprise at least one of a noise value sampled from a noise distribution or a data point sampled from the one or more output distributions.

18. The one or more non-transitory computer readable media of any of clauses 14-17, wherein performing the one or more operations to train the energy-based model comprises updating parameters of the energy-based model based on a spectral regularization loss.

19. The one or more non-transitory computer readable media of any of clauses 14-18, wherein the energy function learned by the energy-based model produces a first set of energy values from the first set of values and a second set of energy values from the second set of values, wherein the second set of energy values is higher than the first set of energy values.

20. The one or more non-transitory computer readable media of any of clauses 14-19, wherein the trained generative model comprises a prior network and a decoder network included in a variational autoencoder.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for creating a generative model, the method comprising:
performing one or more operations based on a plurality of training images to generate a trained variational autoencoder, wherein the trained variational autoencoder includes an encoder network that converts the plurality of training images into a set of latent variable values, a prior network that learns a distribution of the set of latent variable values across the plurality of training images, and a decoder network that converts one or more latent variable values into one or more output distributions of pixel values in a plurality of output images;
performing one or more operations to train an energy-based model to learn an energy function based on a first set of values sampled from one or more first distributions associated with the plurality of training images and a second set of values sampled from a posterior distribution used during operation of one or more portions of the trained variational autoencoder, wherein the energy-based model is distinct from the prior network; and
creating a sequential model that includes the one or more portions of the trained variational autoencoder and the energy-based model, wherein the sequential model applies one or more energy values generated via the energy-based model to a third set of values sampled from the posterior distribution to produce a fourth set of values,
wherein, in operation, the sequential model produces the fourth set of values in order to generate a new image that is not included in the plurality of training images.

2. The computer-implemented method of claim 1, wherein the one or more portions of the trained variational autoencoder include the prior network and the decoder network.

3. The computer-implemented method of claim 1, wherein the new image comprises at least one face.

4. A computer-implemented method for creating a generative model, the method comprising:
performing one or more operations based on a training dataset to generate a trained generative model, wherein the trained generative model includes a first component that converts a plurality of data points included in the training dataset into a set of latent variable values, a second component that learns a distribution of the set of latent variable values across the training dataset, and a third component that converts one or more latent variable values into one or more output distributions;
performing one or more operations to train an energy-based model to learn an energy function based on a first set of values sampled from one or more first distributions associated with the training dataset and a second set of values sampled from a posterior distribution used during operation of one or more portions of the trained generative model, wherein the energy-based model is distinct from a prior network included in the trained generative model; and
creating a sequential model that includes the one or more portions of the trained generative model and the energy-based model, wherein the sequential model applies one or more energy values generated via the energy-based model to a third set of values sampled from the posterior distribution to produce a fourth set of values,
wherein, in operation, the sequential model produces the fourth set of values in order to generate a new data point that is not included in the training dataset.

5. The computer-implemented method of claim 4, wherein performing the one or more operations to train the energy-based model comprises performing a positive phase that updates the energy function based on a derivative of a log-likelihood of the training dataset and the first set of values.

6. The computer-implemented method of claim 5, wherein performing the one or more operations to train the energy-based model further comprises performing a negative phase that updates the energy function based on the derivative of the log-likelihood of the training dataset and the second set of values.

7. The computer-implemented method of claim 4, wherein performing the one or more operations to train the energy-based model comprises iteratively updating parameters of the energy-based model based on a gradient of the energy function with respect to one or more noise values used during operation of the one or more portions of the trained generative model.

8. The computer-implemented method of claim 7, wherein the one or more noise values include a first noise value used in operation of the second component to generate one or more latent variable values and a second noise value used in operation of the third component to generate the one or more output distributions.

9. The computer-implemented method of claim 4, wherein performing the one or more operations to train the energy-based model comprises applying a spectral regularization loss to a spectral norm of a convolutional layer in the energy-based model.

10. The computer-implemented method of claim 4, wherein the distribution of the set of latent variables learned by the second component comprises a hierarchy of latent variables, and wherein the performing the one or more operations to generate the trained generative model comprises:

sampling one first value from a first group of latent variables included in the hierarchy of latent variables; and sampling another first value from a second group of latent variables included in the hierarchy of latent variables based on the one first value and a feature map.

11. The computer-implemented method of claim 4, wherein the energy-based model comprises a first residual block and a second residual block with downsampling.

12. The computer-implemented method of claim 11, wherein the first residual block and the second residual block comprise a Swish activation function.

13. The computer-implemented method of claim 4, wherein the energy-based model comprises a convolutional layer, a global sum pooling layer, and a fully connected layer.

14. One or more non-transitory computer readable media storing instructions that, when executed by one or more processors, cause the one or more processors to perform the steps of:

performing one or more operations based on a training dataset to generate a trained generative model, wherein the trained generative model includes a first component that converts a plurality of data points included in the training dataset into a set of latent variable values, a second component that learns a distribution of the set of latent variable values across the training dataset, and a third component that converts one or more latent variable values into one or more output distributions;

performing one or more operations to train an energy-based model to learn an energy function based on a first set of values sampled from one or more first distributions associated with the training dataset and a second set of values sampled from a posterior distribution used during operation of one or more portions of the trained generative model, wherein the energy-based model is distinct from a prior network included in the trained generative model; and creating a sequential model that includes the one or more portions of the trained generative model and the energy-based model, wherein the sequential model applies one or more energy values generated via the energy-based model to a third set of values sampled from the posterior distribution to produce a fourth set of values, wherein, in operation, the sequential model produces the fourth set of values in order to generate a new data point that is not included in the training dataset.

15. The one or more non-transitory computer readable media of claim 14, wherein performing the one or more operations to train the energy-based model comprises:

performing a positive phase that updates the energy function based on a derivative of a log-likelihood of the training dataset and the first set of values; and performing a negative phase that updates the energy function based on the derivative of the log-likelihood of the training dataset and the second set of values.

16. The one or more non-transitory computer readable media of claim 14, wherein performing the one or more operations to train the energy-based model comprises iteratively updating parameters of the energy-based model based on a gradient of the energy function with respect to one or more values used during operation of the one or more portions of the trained generative model.

17. The one or more non-transitory computer readable media of claim 16, wherein the one or more values comprise at least one of a noise value sampled from a noise distribution or a data point sampled from the one or more output distributions.

18. The one or more non-transitory computer readable media of claim 14, wherein performing the one or more operations to train the energy-based model comprises updating parameters of the energy-based model based on a spectral regularization loss.

19. The one or more non-transitory computer readable media of claim 14, wherein the energy function learned by the energy-based model produces a first set of energy values from the first set of values and a second set of energy values from the second set of values, wherein the second set of energy values is higher than the first set of energy values.

20. The one or more non-transitory computer readable media of claim 14, wherein the trained generative model comprises the prior network and a decoder network included in a variational autoencoder.

21. The computer-implemented method of claim 1, wherein performing one or more operations to train the energy-based model occurs after the trained variational autoencoder is generated.

* * * * *